(12) United States Patent
Simpson et al.

(10) Patent No.: US 12,272,012 B2
(45) Date of Patent: *Apr. 8, 2025

(54) DYNAMIC MIXED REALITY CONTENT IN VIRTUAL REALITY

(71) Applicant: Meta Platforms Technologies, LLC, Menlo Park, CA (US)

(72) Inventors: Sarah Tanner Simpson, Mountain View, CA (US); Gregory Smith, San Francisco, CA (US); Jeffrey Witthuhn, Oakland, CA (US); Ying-Chieh Huang, Fremont, CA (US); Shuang Li, San Jose, CA (US); Wenliang Zhao, Belmont, CA (US); Peter Koch, Los Altos, CA (US); Meghana Reddy Guduru, Mountain View, CA (US); Ioannis Pavlidis, Newark, CA (US); Xiang Wei, Fremont, CA (US); Kevin Xiao, San Carlos, CA (US); Kevin Joseph Sheridan, Redwood City, CA (US); Bodhi Keanu Donselaar, London (GB); Federico Adrian Camposeco Paulsen, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,712

(22) Filed: May 22, 2023

(65) Prior Publication Data

US 2023/0290089 A1 Sep. 14, 2023

Related U.S. Application Data

(63) Continuation of application No. 17/336,776, filed on Jun. 2, 2021, now Pat. No. 11,676,348.

(51) Int. Cl.
*G06T 19/00* (2011.01)
*G06T 7/11* (2017.01)
(Continued)

(52) U.S. Cl.
CPC .............. *G06T 19/006* (2013.01); *G06T 7/11* (2017.01); *G06T 7/70* (2017.01); *G06V 20/20* (2022.01);
(Continued)

(58) Field of Classification Search
CPC . G06T 19/006; G06T 7/11; G06T 7/70; G06T 2207/30196; G06V 20/20; G06V 40/10
(Continued)

(56) References Cited

U.S. PATENT DOCUMENTS 770,149 A 9/1904 Bailey
6,748,420 B1 6/2004 Quatrano et al.
(Continued)

FOREIGN PATENT DOCUMENTS

CN 111095165 B 11/2024
EP 2887322 B1 2/2020
(Continued)

OTHER PUBLICATIONS

Advisory Action mailed Oct. 13, 2021 for U.S. Appl. No. 16/567,563, filed Sep. 11, 2019, 3 pages.
(Continued)

*Primary Examiner* — Charles Tseng
(74) *Attorney, Agent, or Firm* — Potomac Law Group, PLLC; Dannon G. Allbee

(57) ABSTRACT

In one embodiment, a method includes capturing images of a first user wearing a VR display device in a real-world environment. The method includes receiving a VR rendering of a VR environment. The VR rendering is from the perspective of the mobile computing device with respect to the
(Continued)

VR display device. The method includes generating a first MR rendering of the first user in the VR environment. The first MR rendering of the first user is based on a compositing of the images of the first user and the VR rendering. The method includes receiving an indication of a user interaction with one or more elements of the VR environment in the first MR rendering. The method includes generating, in real-time responsive to the indication of the user interaction with the one or more elements, a second MR rendering of the first user in the VR environment. The one or more elements are modified according to the interaction.

20 Claims, 20 Drawing Sheets

(51) Int. Cl.
*G06T 7/70* (2017.01)
*G06V 20/20* (2022.01)
*G06V 40/10* (2022.01)

(52) U.S. Cl.
CPC .... *G06V 40/10* (2022.01); *G06T 2207/30196* (2013.01)

(58) Field of Classification Search
USPC .......................................................... 345/633
See application file for complete search history.

(56) References Cited

U.S. PATENT DOCUMENTS

| | | |
|---|---|---|
| 6,842,175 B1 | 1/2005 | Schmalstieg et al. |
| 6,842,877 B2 | 1/2005 | Robarts et al. |
| 7,395,534 B2 | 7/2008 | Alcazar et al. |
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Prada Gomez et al. |
| 8,726,233 B1 | 5/2014 | Raghavan |
| 8,930,940 B2 | 1/2015 | Xu et al. |
| 8,947,351 B1 | 2/2015 | Noble |
| 8,947,427 B2 | 2/2015 | Shuster et al. |
| 9,055,404 B2 | 6/2015 | Setlur et al. |
| 9,081,177 B2 | 7/2015 | Wong et al. |
| 9,117,274 B2 | 8/2015 | Liao et al. |
| 9,129,404 B1 | 9/2015 | Wagner |
| 9,292,089 B1 | 3/2016 | Sadek |
| 9,424,239 B2 | 8/2016 | Dunn et al. |
| 9,443,353 B2 | 9/2016 | Vaddadi et al. |
| 9,477,368 B1 | 10/2016 | Filip et al. |
| 9,478,030 B1 | 10/2016 | Lecky |
| 9,530,252 B2 | 12/2016 | Poulos et al. |
| 9,607,422 B1 | 3/2017 | Leedom |
| 9,658,737 B2 | 5/2017 | Rothenberger et al. |
| 9,817,472 B2 | 11/2017 | Lee et al. |
| 9,870,716 B1 | 1/2018 | Rao et al. |
| 9,922,462 B2 | 3/2018 | Miller |
| 10,013,625 B1 | 7/2018 | Ahammad et al. |
| 10,015,503 B1 | 7/2018 | Ahammad |
| 10,220,303 B1 | 3/2019 | Schmidt et al. |
| 10,248,284 B2 | 4/2019 | Itani et al. |
| 10,319,154 B1 | 6/2019 | Chakravarthula et al. |
| 10,335,572 B1 | 7/2019 | Kumar |
| 10,473,935 B1 | 11/2019 | Gribetz et al. |
| 10,521,944 B2 | 12/2019 | Sareen et al. |
| 10,551,993 B1 | 2/2020 | Sanocki et al. |
| 10,715,851 B1 | 7/2020 | Shankar et al. |
| 10,783,714 B2 | 9/2020 | Diament et al. |
| 10,799,792 B2 | 10/2020 | Rios |
| 10,803,663 B2 | 10/2020 | Wang et al. |
| 10,841,292 B2 | 11/2020 | Soon-Shiong |
| 10,902,679 B2 | 1/2021 | Molyneaux et al. |
| 10,909,762 B2 | 2/2021 | Karalis et al. |
| 10,950,034 B1 | 3/2021 | Garcia et al. |
| 10,963,144 B2 | 3/2021 | Fox et al. |
| 10,996,915 B2 | 5/2021 | Kim |
| 11,009,716 B2 | 5/2021 | Kiemele et al. |
| 11,017,609 B1 | 5/2021 | Buzzerio et al. |
| 11,064,047 B1 | 7/2021 | Stegall et al. |
| 11,068,393 B2 | 7/2021 | Mandaleeka |
| 11,100,812 B2 | 8/2021 | Daniel et al. |
| 11,113,893 B1 | 9/2021 | Ma et al. |
| 11,126,320 B1 | 9/2021 | Thompson et al. |
| 11,170,576 B2 | 11/2021 | Ravasz et al. |
| 11,176,755 B1 | 11/2021 | Tichenor et al. |
| 11,178,376 B1 | 11/2021 | Tichenor et al. |
| 11,216,152 B2 | 1/2022 | Alexander |
| 11,227,445 B1 | 1/2022 | Tichenor et al. |
| 11,238,664 B1 | 2/2022 | Tavakoli et al. |
| 11,270,513 B2 | 3/2022 | Yerli |
| 11,270,522 B1 | 3/2022 | Tauber et al. |
| 11,307,647 B2 | 4/2022 | Bond et al. |
| 11,409,405 B1 | 8/2022 | Hlavac et al. |
| 11,417,054 B1 | 8/2022 | Tanner et al. |
| 11,433,304 B2 | 9/2022 | Fish et al. |
| 11,521,361 B1 | 12/2022 | Taguchi et al. |
| 11,593,997 B2 | 2/2023 | Smith et al. |
| 11,636,655 B2 | 4/2023 | Ma et al. |
| 11,651,573 B2 | 5/2023 | Tichenor et al. |
| 11,676,348 B2 * | 6/2023 | Simpson .................. G06T 7/70 345/633 |
| 11,720,167 B2 | 8/2023 | Bond et al. |
| 11,748,944 B2 | 9/2023 | Karadayi et al. |
| 11,762,952 B2 | 9/2023 | Hlavac et al. |
| 11,769,304 B2 | 9/2023 | Tichenor et al. |
| 11,798,247 B2 | 10/2023 | Karadayi et al. |
| 11,847,753 B2 | 12/2023 | Tichenor et al. |
| 11,928,308 B2 | 3/2024 | Hlavac et al. |
| 11,935,208 B2 | 3/2024 | Karadayi et al. |
| 12,130,998 B1 | 10/2024 | Roben |
| 2003/0038805 A1 | 2/2003 | Wong et al. |
| 2003/0106063 A1 | 6/2003 | Guedalia |
| 2004/0237082 A1 | 11/2004 | Alcazar et al. |
| 2005/0018216 A1 | 1/2005 | Barsness et al. |
| 2008/0089587 A1 | 4/2008 | Kim et al. |
| 2008/0092111 A1 | 4/2008 | Kinnucan et al. |
| 2009/0006937 A1 | 1/2009 | Knapp et al. |
| 2009/0199128 A1 | 8/2009 | Matthews et al. |
| 2009/0307623 A1 | 12/2009 | Agarawala et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0185043 A1 | 7/2011 | Zeller et al. |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0218301 A1 | 8/2012 | Miller |
| 2012/0249741 A1 | 10/2012 | Maciocci et al. |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0076788 A1 | 3/2013 | Ben Zvi |
| 2013/0083173 A1 | 4/2013 | Geisner et al. |
| 2013/0117688 A1 | 5/2013 | Yerli |
| 2013/0125066 A1 | 5/2013 | Klein et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2013/0293468 A1 | 11/2013 | Perez et al. |
| 2013/0336629 A1 | 12/2013 | Mulholland et al. |
| 2014/0075370 A1 | 3/2014 | Guerin et al. |
| 2014/0114845 A1 | 4/2014 | Rogers et al. |
| 2014/0125598 A1 | 5/2014 | Cheng et al. |
| 2014/0149901 A1 | 5/2014 | Hunter |
| 2014/0225922 A1 | 8/2014 | Sbardella |
| 2014/0236996 A1 | 8/2014 | Masuko et al. |
| 2014/0270494 A1 | 9/2014 | Sawhney et al. |
| 2014/0357366 A1 | 12/2014 | Koganezawa et al. |

(56) References Cited

U.S. PATENT DOCUMENTS

| | | |
|---|---|---|
| 2014/0375683 A1 | 12/2014 | Salter et al. |
| 2014/0375691 A1 | 12/2014 | Kasahara |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0074506 A1 | 3/2015 | Dunn et al. |
| 2015/0074742 A1 | 3/2015 | Kohno et al. |
| 2015/0077592 A1 | 3/2015 | Fahey |
| 2015/0123966 A1 | 5/2015 | Newman |
| 2015/0143302 A1 | 5/2015 | Chang et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0213371 A1 | 7/2015 | Nitz et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0269780 A1 | 9/2015 | Herman et al. |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0133170 A1 | 5/2016 | Fateh |
| 2016/0147308 A1 | 5/2016 | Gelman et al. |
| 2016/0147408 A1 | 5/2016 | Bevis et al. |
| 2016/0170603 A1 | 6/2016 | Bastien et al. |
| 2016/0180590 A1 | 6/2016 | Kamhi et al. |
| 2016/0189386 A1 | 6/2016 | Michaelraj et al. |
| 2016/0260261 A1 | 9/2016 | Hsu |
| 2016/0378291 A1 | 12/2016 | Pokrzywka |
| 2017/0041388 A1 | 2/2017 | Tal et al. |
| 2017/0060230 A1 | 3/2017 | Faaborg et al. |
| 2017/0069134 A1 | 3/2017 | Shapira et al. |
| 2017/0075420 A1 | 3/2017 | Yu et al. |
| 2017/0076500 A1 | 3/2017 | Maggiore et al. |
| 2017/0084051 A1 | 3/2017 | Weising et al. |
| 2017/0099295 A1 | 4/2017 | Ricci |
| 2017/0109936 A1 | 4/2017 | Powderly et al. |
| 2017/0124230 A1 | 5/2017 | Liu et al. |
| 2017/0139478 A1 | 5/2017 | Jeon et al. |
| 2017/0192513 A1 | 7/2017 | Karmon et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0258526 A1 | 9/2017 | Lang |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0007099 A1 | 1/2018 | Ein-Gil et al. |
| 2018/0059901 A1 | 3/2018 | Gullicksen |
| 2018/0082480 A1 | 3/2018 | White et al. |
| 2018/0095616 A1 | 4/2018 | Valdivia et al. |
| 2018/0095635 A1 | 4/2018 | Valdivia et al. |
| 2018/0095636 A1 | 4/2018 | Valdivia et al. |
| 2018/0096507 A1 | 4/2018 | Valdivia et al. |
| 2018/0096519 A1 | 4/2018 | Tokubo |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0158134 A1 | 6/2018 | Hassan |
| 2018/0189568 A1 | 7/2018 | Powderly et al. |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0314484 A1 | 11/2018 | Pahud et al. |
| 2018/0315162 A1 | 11/2018 | Sturm et al. |
| 2018/0322701 A1 | 11/2018 | Pahud et al. |
| 2018/0323972 A1 | 11/2018 | Reed et al. |
| 2018/0335925 A1 | 11/2018 | Hsiao et al. |
| 2018/0350144 A1 | 12/2018 | Rathod |
| 2018/0357780 A1 | 12/2018 | Young et al. |
| 2018/0365897 A1 | 12/2018 | Pahud et al. |
| 2019/0005724 A1 | 1/2019 | Pahud et al. |
| 2019/0018498 A1 | 1/2019 | West et al. |
| 2019/0094981 A1 | 3/2019 | Bradski et al. |
| 2019/0096131 A1 | 3/2019 | Crews et al. |
| 2019/0107894 A1 | 4/2019 | Hebbalaguppe et al. |
| 2019/0107991 A1 | 4/2019 | Spivack et al. |
| 2019/0108682 A1 | 4/2019 | Spivack et al. |
| 2019/0114061 A1 | 4/2019 | Daniels et al. |
| 2019/0130656 A1 | 5/2019 | Gebbie et al. |
| 2019/0130788 A1 | 5/2019 | Seaton |
| 2019/0155481 A1 | 5/2019 | Diverdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0221035 A1 | 7/2019 | Clark et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0278432 A1 | 9/2019 | Bennett et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0294721 A1 | 9/2019 | Keifer et al. |
| 2019/0294889 A1 | 9/2019 | Sriram et al. |
| 2019/0340799 A1 | 11/2019 | Dryer et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0371060 A1 | 12/2019 | Energin et al. |
| 2019/0371279 A1 | 12/2019 | Mak |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0385371 A1 | 12/2019 | Joyce et al. |
| 2020/0013211 A1 | 1/2020 | Bergen et al. |
| 2020/0042108 A1 | 2/2020 | Wan |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111256 A1 | 4/2020 | Bleyer et al. |
| 2020/0151965 A1 | 5/2020 | Forbes et al. |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226823 A1 | 7/2020 | Stachniak et al. |
| 2020/0241300 A1 | 7/2020 | Robinson et al. |
| 2020/0242842 A1* | 7/2020 | Fukazawa ............... G06T 7/11 |
| 2020/0279386 A1 | 9/2020 | Da Veiga |
| 2020/0279429 A1 | 9/2020 | Upadhyay et al. |
| 2020/0285761 A1 | 9/2020 | Buck et al. |
| 2020/0289934 A1 | 9/2020 | Azmandian et al. |
| 2020/0312028 A1 | 10/2020 | Charvat et al. |
| 2020/0334908 A1 | 10/2020 | Wilson et al. |
| 2020/0342673 A1 | 10/2020 | Lohr et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2020/0368616 A1 | 11/2020 | Delamont |
| 2020/0375666 A1* | 12/2020 | Murphy ............... A61B 34/20 |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |
| 2021/0096726 A1 | 4/2021 | Faulkner et al. |
| 2021/0097768 A1 | 4/2021 | Malia et al. |
| 2021/0103449 A1 | 4/2021 | Terpstra et al. |
| 2021/0111890 A1 | 4/2021 | Reed et al. |

(56) References Cited

U.S. PATENT DOCUMENTS

| | | |
|---|---|---|
| 2021/0124821 A1 | 4/2021 | Spivak et al. |
| 2021/0125414 A1 | 4/2021 | Berkebile |
| 2021/0126823 A1 | 4/2021 | Poess et al. |
| 2021/0158608 A1 | 5/2021 | Boggs et al. |
| 2021/0183114 A1 | 6/2021 | Corson |
| 2021/0191600 A1* | 6/2021 | Lemay .............. G06F 3/0485 |
| 2021/0192856 A1 | 6/2021 | Lee |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0322856 A1 | 10/2021 | Mrkar et al. |
| 2021/0373741 A1 | 12/2021 | Agarawala et al. |
| 2021/0378768 A1 | 12/2021 | Olson et al. |
| 2021/0390765 A1 | 12/2021 | Laaksonen et al. |
| 2022/0038522 A1 | 2/2022 | Goolkasian et al. |
| 2022/0068035 A1 | 3/2022 | Tichenor et al. |
| 2022/0084279 A1 | 3/2022 | Lindmeier et al. |
| 2022/0091722 A1 | 3/2022 | Faulkner et al. |
| 2022/0100265 A1 | 3/2022 | Kies et al. |
| 2022/0100279 A1 | 3/2022 | Lee et al. |
| 2022/0101612 A1 | 3/2022 | Palangie et al. |
| 2022/0121344 A1 | 4/2022 | Pastrana Vicente et al. |
| 2022/0122329 A1 | 4/2022 | Tichenor et al. |
| 2022/0139052 A1 | 5/2022 | Tavakoli et al. |
| 2022/0161422 A1 | 5/2022 | Chen et al. |
| 2022/0211188 A1 | 7/2022 | Daub et al. |
| 2022/0261088 A1 | 8/2022 | Pinchon et al. |
| 2022/0276765 A1 | 9/2022 | Hlavac et al. |
| 2022/0318035 A1 | 10/2022 | Garstenauer et al. |
| 2022/0358715 A1 | 11/2022 | Tanner et al. |
| 2022/0406021 A1 | 12/2022 | Lebeau et al. |
| 2022/0414403 A1 | 12/2022 | Hlavac et al. |
| 2023/0022194 A1 | 1/2023 | Soryal |
| 2023/0056976 A1 | 2/2023 | Tanner et al. |
| 2023/0126837 A1 | 4/2023 | Karadayi et al. |
| 2023/0127438 A1 | 4/2023 | Karadayi et al. |
| 2023/0134355 A1 | 5/2023 | Lansel et al. |
| 2023/0152851 A1 | 5/2023 | Berliner et al. |
| 2023/0169737 A1 | 6/2023 | Taguchi et al. |
| 2023/0196766 A1 | 6/2023 | Pla I Conesa et al. |
| 2023/0215120 A1 | 7/2023 | Ma et al. |
| 2023/0221797 A1 | 7/2023 | Louie et al. |
| 2023/0244755 A1 | 8/2023 | Hlavac et al. |
| 2023/0245386 A1 | 8/2023 | Karadayi et al. |
| 2023/0260000 A1 | 8/2023 | Belavy |
| 2023/0260233 A1 | 8/2023 | Goncalves et al. |
| 2023/0367611 A1 | 11/2023 | Blakeley et al. |
| 2023/0384859 A1 | 11/2023 | Bond et al. |
| 2023/0410436 A1 | 12/2023 | Beauchamp et al. |
| 2023/0419616 A1 | 12/2023 | Dudovitch et al. |
| 2023/0419998 A1 | 12/2023 | Nguyen et al. |
| 2024/0045495 A1 | 2/2024 | Elhadad et al. |
| 2024/0126406 A1 | 4/2024 | Hlavac et al. |
| 2024/0153205 A1 | 5/2024 | Huergo Wagner et al. |
| 2024/0233292 A1 | 7/2024 | Tichenor et al. |
| 2024/0264851 A1 | 8/2024 | Blakeley et al. |
| 2024/0311498 A1 | 9/2024 | Millberg et al. |
| 2024/0312143 A1 | 9/2024 | Millberg et al. |
| 2024/0331278 A1 | 10/2024 | Arora et al. |
| 2024/0331287 A1 | 10/2024 | Karadayi et al. |
| 2024/0331312 A1 | 10/2024 | Freeman et al. |
| 2024/0331320 A1 | 10/2024 | Taguchi et al. |
| 2024/0338070 A1 | 10/2024 | Tanner et al. |
| 2024/0361837 A1 | 10/2024 | Louie et al. |
| 2024/0402869 A1 | 12/2024 | Boesel et al. |

FOREIGN PATENT DOCUMENTS

| | | |
|---|---|---|
| EP | 4439247 A1 | 10/2024 |
| EP | 4439248 A1 | 10/2024 |
| JP | 2019101743 A | 6/2019 |
| JP | 2022147265 A | 10/2022 |
| WO | 2014097706 A1 | 6/2014 |
| WO | 2015192117 A1 | 12/2015 |
| WO | 2016041088 A1 | 3/2016 |
| WO | 2018235371 A1 | 12/2018 |
| WO | 2019143839 A1 | 7/2019 |
| WO | 2020159302 A1 | 8/2020 |
| WO | 2020226832 A1 | 11/2020 |
| WO | 2021163373 A1 | 8/2021 |
| WO | 2022055822 A1 | 3/2022 |

OTHER PUBLICATIONS

"App Clips," Apple Developer, 2022, 4 pages, Retrieved from the Internet: URL: https://developer.apple.com/app-clips/.

Broitman A., "Learn and Do More with Lens in Google Images," Oct. 25, 2018, Retrieved from the Internet: URL: https://www.blog.google/products/search/learn-and-do-more-lens-google-images/, 4 pages.

Final Office Action mailed Aug. 5, 2021 for U.S. Appl. No. 16/567,563, filed Sep. 11, 2019, 11 Pages.

Fleury C., et aL, "A Generic Model for Embedding Users' Physical Workspaces into Multi-Scale Collaborative Virtual Environments," 20th International Conference on Artificial Reality and Telexistence, Dec. 3, 2010, 8 pages.

"Google Play Instant," Retrieved on [Jan. 27, 2022], 2 pages, Retrieved from the Internet: URL: https://developer.android.com/topic/google-play-instant.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/045538, mailed Mar. 24, 2022, 9 pages.

International Preliminary Report on Patentability for International Application No. PCT/US2021/044098, mailed Mar. 9, 2023, 18 pages.

International Preliminary Report on Patentability for International Application No. PCT/US2022/032288, mailed Jan. 11, 2024, 10 pages.

International Preliminary Report on Patentability for International Application No. PCT/US2022/033338, mailed Jan. 11, 2024, 11 pages.

International Preliminary Report on Patentability for International Application No. PCT/US2022/040484, mailed Feb. 29, 2024, 9 pages.

International Preliminary Report on Patentability for International Application No. PCT/US2022/045510, mailed May 10, 2024, 9 pages.

International Search Report and Written Opinion for International Application No. PCT/US2020/045538, mailed Oct. 23, 2020, 11 Pages.

International Search Report and Written Opinion for International Application No. PCT/US2020/051763, mailed Feb. 3, 2021, 11 Pages.

International Search Report and Written Opinion for International Application No. PCT/US2022/020292 mailed Aug. 17, 2022, 17 pages.

International Search Report and Written Opinion for International Application No. PCT/US2022/031840, mailed Sep. 13, 2022, 13 pages.

International Search Report and Written Opinion for International Application No. PCT/US2022/032288, mailed Sep. 16, 2022, 11 pages.

International Search Report and Written Opinion for International Application No. PCT/US2022/033338 mailed Sep. 6, 2022, 13 pages.

International Search Report and Written Opinion for International Application No. PCT/US2022/040484, mailed Nov. 25, 2022, 11 pages.

International Search Report and Written Opinion for International Application No. PCT/US2022/045510, mailed Jan. 19, 2023, 10 pages.

International Search Report and Written Opinion for International Application No. PCT/US2022/053780, mailed Mar. 20, 2023, 10 pages.

(56) References Cited

OTHER PUBLICATIONS

International Search Report and Written Opinion for International Application No. PCT/US2022/054413, mailed Jul. 7, 2023, 11 pages.
International Search Report and Written Opinion for International Application No. PCT/US2023/021312, mailed Aug. 24, 2023, 15 pages.
Invitation to Pay Additional Fees for International Application No. PCT/US2021/044098, Nov. 3, 2021, 15 pages.
Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Melnick K., "Google Rolls out New AR Features for Its Lens APP," May 28, 2019, Retrieved from the Internet: URL: https://vrscout.com/news/new-ar-features-google-lens/ , 3 pages.
Non-Final Office Action mailed Dec. 8, 2022 for U.S. Appl. No. 17/659,431, filed Apr. 15, 2022, 12 pages.
Non-Final Office Action mailed Jan. 25, 2021 for U.S. Appl. No. 16/567,563, filed Sep. 11, 2019, 10 Pages.
Notice of Allowance mailed Dec. 21, 2021 for U.S. Appl. No. 16/567,563, filed Sep. 11, 2019, 6 pages.
Notice of Allowance mailed Mar. 21, 2023 for U.S. Appl. No. 17/659,431, filed Apr. 15, 2022, 5 pages.
Office Action mailed Aug. 21, 2023 for Chinese Application No. 202080054473.3, filed Aug. 8, 2020, 7 pages.
Office Action mailed Feb. 26, 2024 for European Patent Application No. 20761419.9, filed on Aug. 8, 2020, 7 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Prosecution History of U.S. Appl. No. 16/567,563 dated Jan. 25, 2021, through Dec. 21, 2021, 52 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.
Wikipedia: "Simultaneous Localization and Mapping," Jul. 25, 2017, 7 pages, Retrieved from the Internet: URL: https://en.wikipedia.org/w/index.php?title=Simultaneous_localization_and_mappingoldid=731478358 [Retrieved on Oct. 23, 2017].
Wikipedia, "Multiple-document Interface," May 8, 2022 [retrieved on Aug. 16, 2023], 5 pages, Retrieved from the Internet: URL: https://web.archive.org/web/20220508091934/https://en.wikipedia.org/wiki/Multipledocument_interface.
European Search Report for European Patent Application No. 24155337.9, dated Jul. 2, 2024, 7 pages.
European Search Report for European Patent Application No. 24156842.7, dated Jun. 25, 2024, 6 pages.
International Preliminary Report on Patentability for International Application No. PCT/US2022/053780, mailed Jul. 4, 2024, 9 pages.
International Preliminary Report on Patentability for International Application No. PCT/US2022/054413, mailed Jul. 25, 2024, 9 pages.
Office Action mailed Jun. 25, 2024 for Japanese Patent Application No. 2021-577408, filed on Aug. 8, 2020, 4 pages.
Tatzgern M., et al., "Adaptive Information Density for Augmented Reality Displays," IEEE Virtual Reality Conference, Mar. 19-23, 2016, pp. 83-92.
European Search Report for European Patent Application No. 24155099.5, dated Aug. 5, 2024, 7 pages.
European Search Report for European Patent Application No. 24158455.6, dated Jun. 28, 2024, 6 pages.
International Preliminary Report on Patentability for International Application No. PCT/US2023/021312, mailed Nov. 21, 2024, 14 pages.

* cited by examiner

DYNAMIC MIXED REALITY CONTENT IN VIRTUAL REALITY

PRIORITY

This application is a continuation under 35 U.S.C. § 120 of U.S. patent application Ser. No. 17/336,776, filed 2 Jun. 2021, which is incorporated herein by reference.

TECHNICAL FIELD

This disclosure generally relates to databases and file management within network environments, and in particular relates to mixed reality (MR) renderings.

BACKGROUND

An existing way of sharing a virtual reality (VR) experience is simply to allow other users to see a two-dimensional (2D) rendering of the VR experience from the first user's point-of-view. This method of translating a VR experience of a first user (wearing a VR headset) onto a 2D display of a second user may be limited to allowing the second user to view what the first user views through their headset. That is, the second user may be limited to viewing a livestream of the VR environment within the first user's field of view (i.e., a 2D rendering of the VR experience from the point of view of the first user). Some experiences may also allow the second user to change their point of view (POV) and independently explore the VR experience.

There also exist ways of translating the VR experience into a mixed reality (MR) experience, where real-world images of the first user are captured by a camera and inserted into a rendering of the VR experience. For example, a camera may be set up to view the first user from a static position. The system may then extract images of the user from the camera and insert these into renderings of the VR experience from a third-person perspective (i.e., the perspective from the camera's position). In this way, the system may provide the second user with a static view of the first user in the VR environment (e.g., an "over-the-shoulder" view from above and behind the first user). However, the second user may be unable to move around independently of the first user to view the first user from other POVs and the portions of the VR environment that the first user is immersed in. Additionally, creating a MR rendering of the first user in the VR environment may require the second user to have specialized high-end equipment, a green screen, a production camera, and a PC running specialized software.

SUMMARY OF PARTICULAR EMBODIMENTS

In particular embodiments, a user of a mobile computing device (e.g., a smartphone) may be able to view mixed reality (MR) rendering of a first user that is immersed in a virtual reality (VR) environment. However, the user of the mobile computing device may be limited in what they can view regarding the MR rendering of the first user, and how they can interact with the VR environment. Thus, one technical challenge may include providing the user of the mobile computing device more than a static viewing experience when the first user is immersed in the VR environment. One solution presented by the embodiments disclosed herein to address the technical challenge of providing an interactive experience for the user of the mobile computing device is to allow the user of the mobile computing device to dynamically interact with the MR rendering and the VR environment, such as by allowing the user of the mobile computing device to interact with the MR and VR content independent of what the user immersed in the VR environment is doing. As an example and not by way of limitation, the mobile computing device may render a MR image of the first user in the VR environment and allow the user of the mobile computing device to move the mobile computing device to other poses (locations, orientations), and the VR system may dynamically update the MR rendering in real-time without the need for an additional setup and re-localization process. Although this disclosure describes a method of generating dynamic MR content in a VR environment in a particular manner, this disclosure contemplates generating dynamic MR content in a VR environment in any suitable manner.

In particular embodiments, one or more computing systems may capture, using one or more cameras of the mobile computing device, one or more images of a first user wearing a VR display device in a real-world environment. The one or more computing systems may transmit, from the mobile computing device, a pose of the mobile computing device to a VR system of the VR display device. The one or more computing systems may receive, at the mobile computing device and from the VR system, a VR rendering of a VR environment. The VR rendering may be from the perspective of the mobile computing device with respect to the VR display device. The one or more computing systems may segment the first user from the one or more images. The one or more computing systems may generate, at the mobile computing device in real-time responsive to capturing the one or more images, a MR rendering of the first user in the VR environment. The MR rendering of the first user may be based on a compositing of the segmented one or more images of the first user and the VR rendering.

Certain technical challenges exist for generating dynamic MR content in VR environments. One technical challenge may include allowing dynamic movement of the mobile computing device while maintaining the image of the user immersed in the VR environment within the frame of the image on the mobile computing device. The solution presented by the embodiments disclosed herein to address this challenge may be to segment the outline or body of the user and superimposing or overlaying an MR rendering of the user immersed in the VR experience on top of a VR environment using a segmentation algorithm. Another technical challenge may include interacting with the generated MR and VR content without the need of specialized equipment. The solution presented by the embodiments disclosed herein to address this challenge may be to utilize the rendering and spatial mapping capabilities of the VR system, allowing the user of the mobile computing device to interact with the generated MR and VR content via the mobile computing device.

Certain embodiments disclosed herein may provide one or more technical advantages. A technical advantage of the embodiments may include rendering a MR image of the first user in a VR environment without the use of a green screen or other specialized gear. Another technical advantage of the embodiments may include allowing the user of the mobile computing device to move the mobile computing device to other poses (locations, orientations), and following an initial localization process (e.g., automatic calibration process), the VR system will dynamically update the MR rendering in real-time without the need for an additional setup and re-localization process of the mobile computing device. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a user of a mobile computing device (e.g., a smartphone) may be able to view a mixed reality (MR) rendering of a first user that is immersed in a virtual reality (VR) environment. However, the user of the mobile computing device may be limited in what they can view regarding the MR rendering of the first user (e.g., they may be limited to a first user point of view), and how they can interact with the VR environment (e.g., they may only be passive viewers that cannot interact with the first user or the VR environment). Thus, one technical challenge may include providing the user of the mobile computing device more than a static viewing experience when the first user is immersed in the VR environment. One solution presented by the embodiments disclosed herein to address the technical challenge of providing an interactive experience for the user of the mobile computing device is to allow the user of the mobile computing device to dynamically interact with the MR rendering (e.g., of the first user immersed in the VR environment) and the VR environment, such as by allowing the user of the mobile computing device to interact with the MR and VR content independent of what the user immersed in the VR environment is doing. As an example and not by way of limitation, the mobile computing device may render a MR image of the first user in the VR environment and allow the user of the mobile computing device to move the mobile computing device to other poses (e.g., positions and orientations), and the VR system may dynamically update the MR rendering in real-time without the need for an additional setup and re-localization process. Although this disclosure describes a method of generating dynamic MR content in a VR environment in a particular manner, this disclosure contemplates generating dynamic MR content in a VR environment in any suitable manner.

Figure 1:
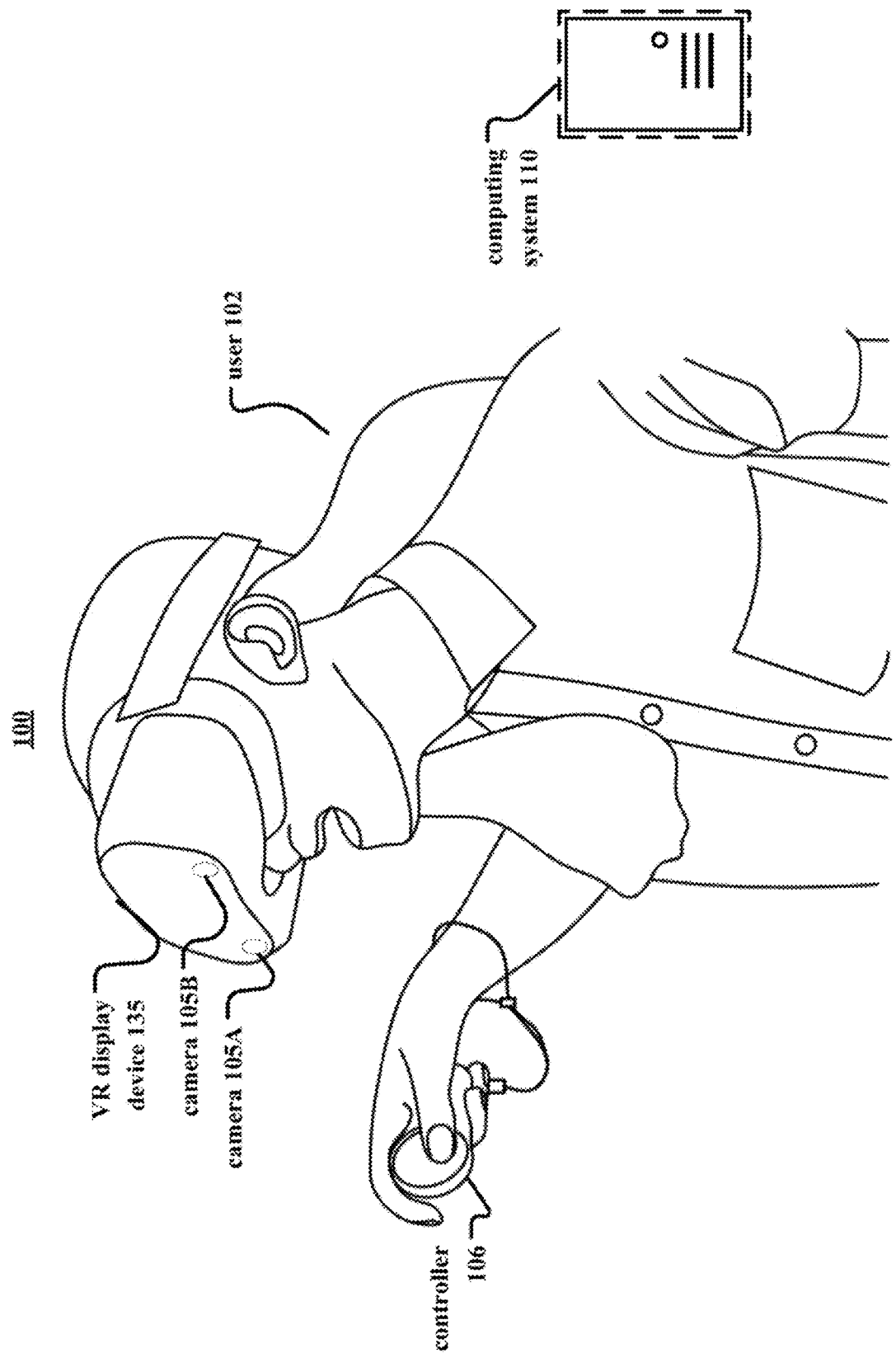
FIG. 1 illustrates an example virtual reality system worn by a user.

FIG. 1 illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). As illustrated in FIG. 1, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding the user 102, as their vision is shielded by the VR display device 135. As such, the passthrough feature described herein may be technically advantageous for providing the user with real-time visual information about their physical surroundings.

Figure 2:
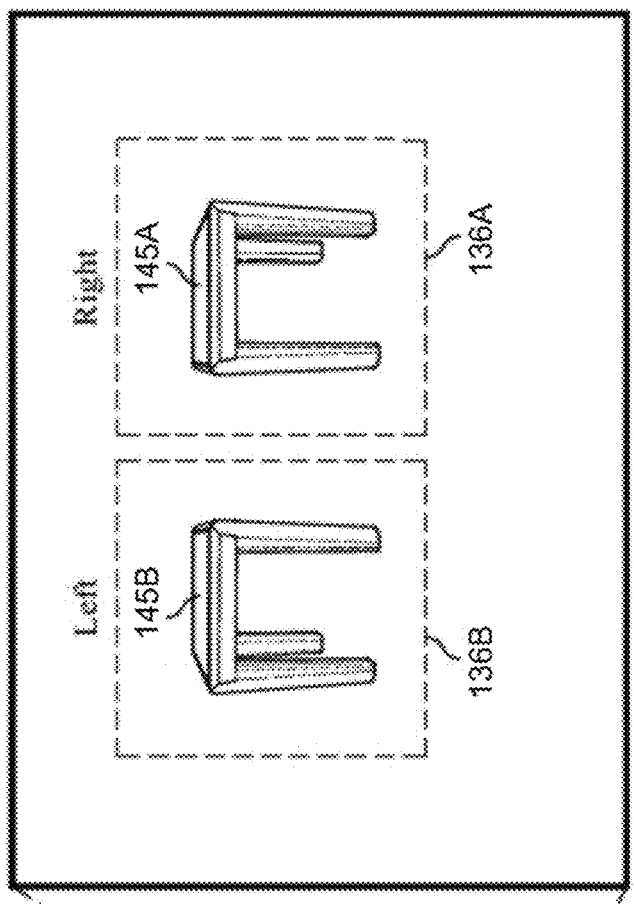
FIG. 2 illustrates an example of a passthrough feature of a virtual reality system.
Figure 2:
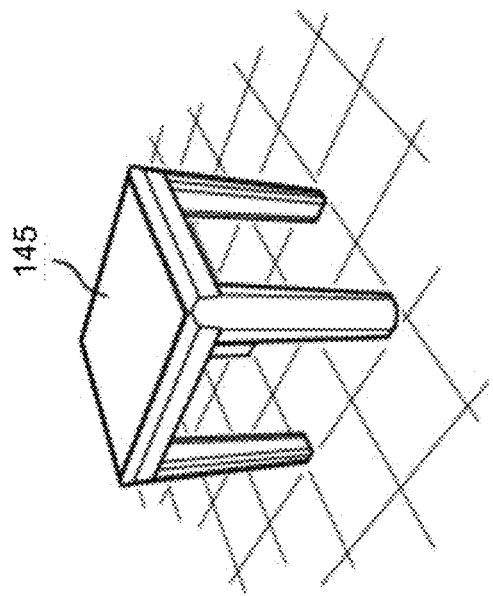
Figure 2:
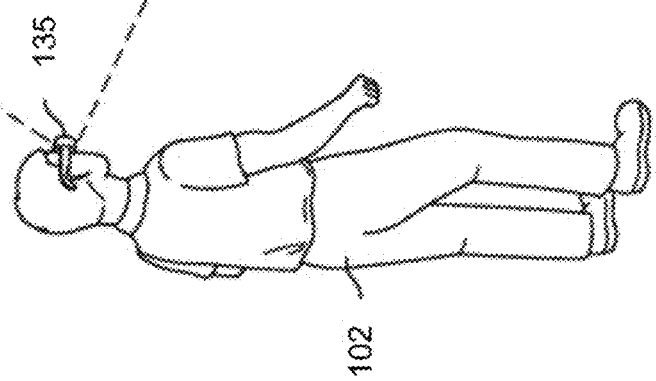

FIG. 2 illustrates an example of the passthrough feature of a virtual reality system 100. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive their physical surroundings while wearing the VR display device 135, the passthrough feature captures information about the physical environment using, for example, one or more cameras 105 such as external-facing cameras 105A-B. The captured information may then be re-projected to the user 102 based on their viewpoints. In particular embodiments where the VR display device 135 has a right display 136A for the user's right eye and a left display 136B for the user's left eye, the virtual reality system 100 may individually render (1) a re-projected view 145A of the physical environment for the right display 135A based on a viewpoint of the user's right eye and (2) a re-projected view 145B of the physical environment for the left display 135B based on a viewpoint of the user's left eye.

Referring again to FIG. 1, the VR display device 135 may have external-facing cameras, such as the two forward-facing cameras 105A and 105B shown in FIG. 1. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, the virtual reality system 100 could use triangulation techniques to compute the depth of the observed feature. For example, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., x-y-z position and r-p-y orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device 135). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 3:
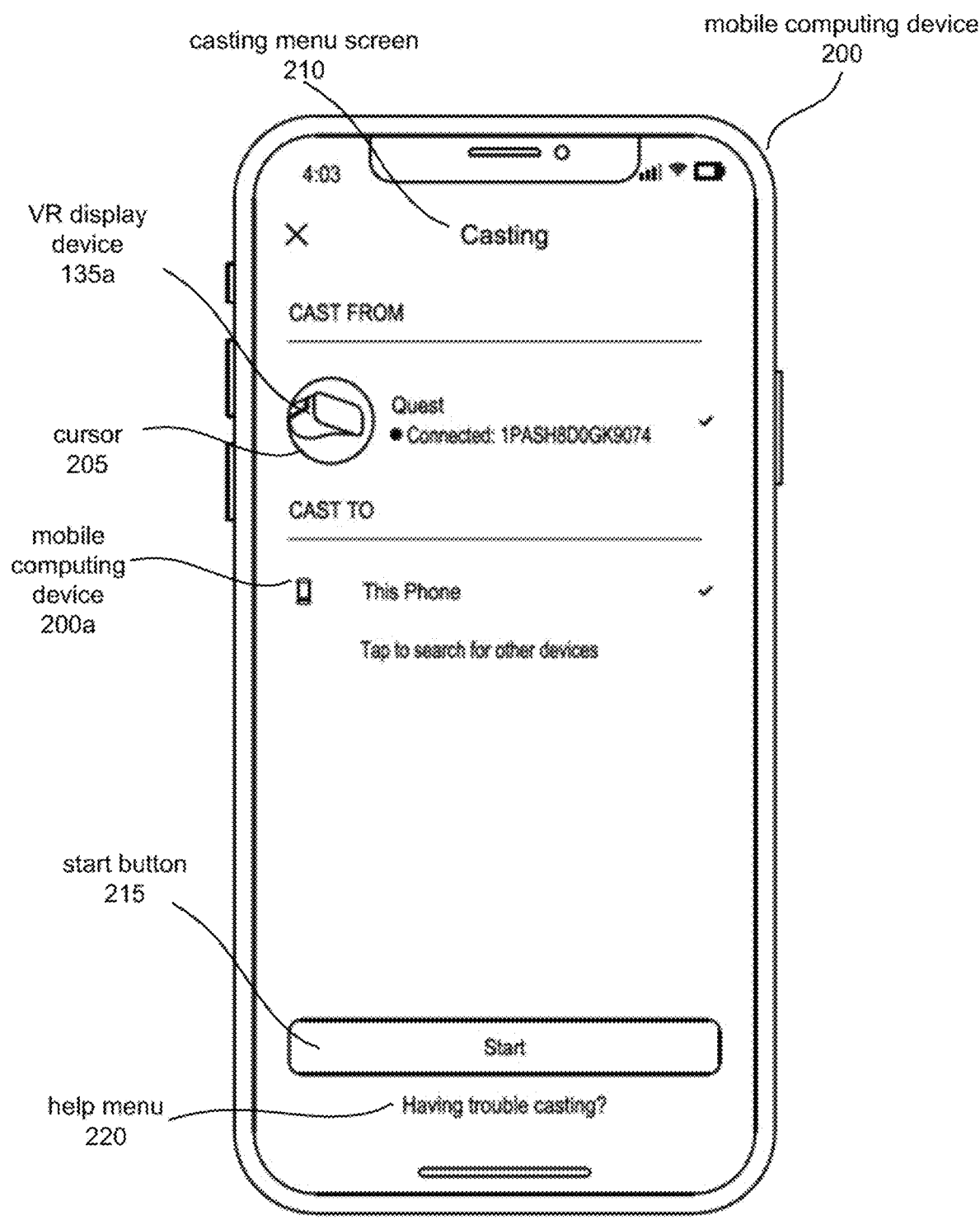
FIG. 3 illustrates an example of a mobile computing device displaying a casting menu screen.

FIG. 3 illustrates an example of a mobile computing device 200 displaying a casting menu screen 210. The casting menu screen 210 may display information showing which device is casting (e.g., the VR display device 135a), and which device is receiving the casting (e.g., the mobile computing device 200a). The casting menu screen 210 may display a start button 215 to begin the casting, as well as a help menu 220 for troubleshooting casting. A cursor 205 may be used to navigate the mobile computing device 200. For example, the cursor 205 may be used to navigate the casting menu screen 210. The cursor 205 may indicate where a user of the mobile computing device 200 touches the screen of the mobile computing device 200.

Figure 4:
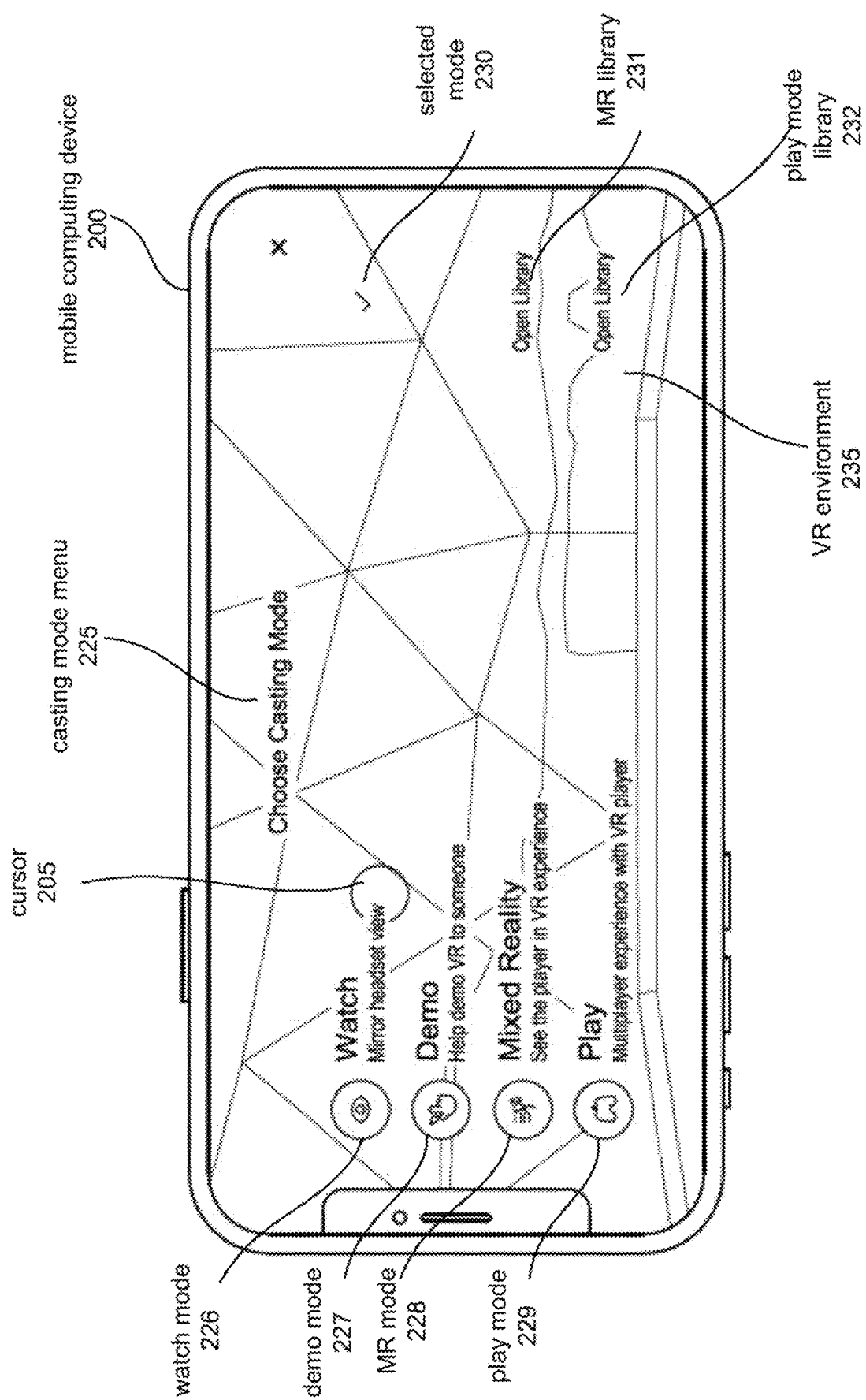
FIG. 4 illustrates an example of the mobile computing device displaying a casting mode menu.

FIG. 4 illustrates an example of the mobile computing device 200 displaying a casting mode menu 225. The casting mode menu 225 may display information showing a selection of different modes. For example, the user may select a watch mode 226, where the mobile computing device 200 may display the headset view from the perspective of the VR display device 135. That is, a user of the mobile computing device 200 may see a first-person view of what the user 102 wearing the VR display device 135 views. Alternatively, the user of the mobile computing device 200 may see an over-the-shoulder third-person view of the user 102 wearing the VR display device 135. As another example, the user may select a demo mode 227, where the mobile computing device 200 may display a demo mode teaching the user of the mobile computing device 200 how to use features and functionalities. That is, the demo mode 227 may be used, for example, to instruct the user how to navigate around the VR environment 235 using the mobile computing device 200. As another example, the user may select a MR mode 228, where the user may view the first user (e.g., the user 102) within the VR environment 235. That is, the user may view a segmented view (discussed in further detail below) of the first user in the VR environment 235. The MR mode 228 may allow the user 102 to access a MR library 231 of associated MR applications and functions. As another example, the user may select a play mode 229, where the user of the mobile computing device 200 may interact with the first user (e.g., the user 102) wearing the VR display device 135. The user of the mobile computing device 200 may play a multiplayer game with the first user, or interact with VR characters and/or the VR environment 235. The play mode 229 may allow the user 102 to access a play mode library 232 of associated multiplayer or interactive VR applications and functions.

Figure 5:
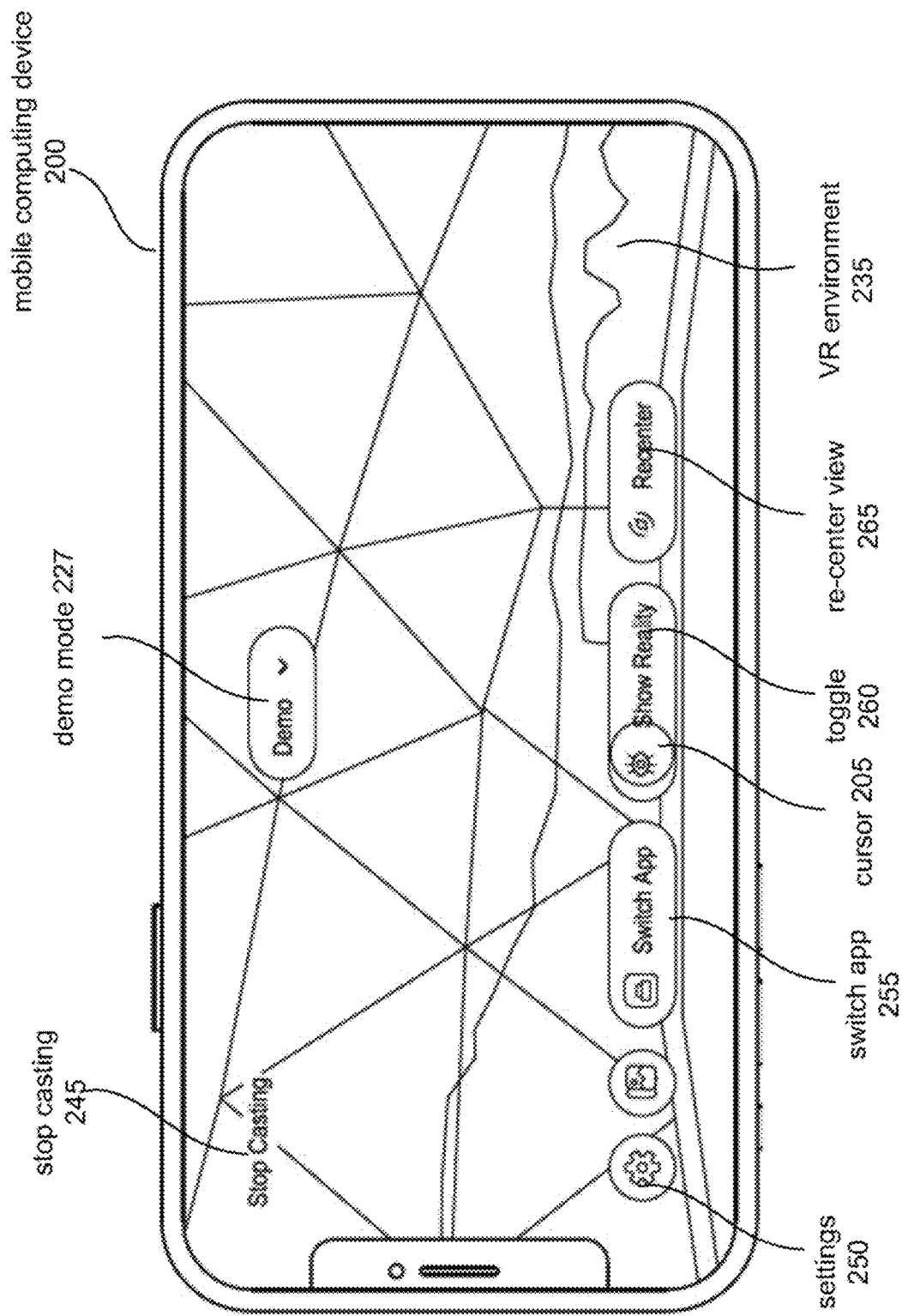
FIG. 5 illustrates an example of the mobile computing device displaying the demo mode as the selected mode from FIG. 4.

FIG. 5 illustrates an example of the mobile computing device 200 displaying the demo mode 227 as the selected mode from FIG. 4. The demo mode 227 may include features (e.g., selectable using the cursor 205) such as stop casting 245, settings 250, switch app 255, toggle 260, and re-center view 265. The stop casting 245 feature may be selected to end the selected view (here, the demo mode 227). The settings 250 feature may be used to adjust user settings and preferences on the mobile computing device 200. The switch app 255 feature may be used to switch between different applications (e.g., if in the play mode 229, the switch app 255 feature may be used to select a different application from the play mode library 232). The toggle 260 feature may be used to toggle between the VR environment 235 and a passthrough view of the real-world environment. The toggle 260 may be a binary button (where the VR environment 235 is displayed or the real-world environment is displayed), or may provide a slider to fade or transition from the VR environment 235 to the real-world environment, and vice versa. The re-center 265 feature may be used to re-center the view of the VR environment 235 on the mobile computing device 200.

Figure 6:
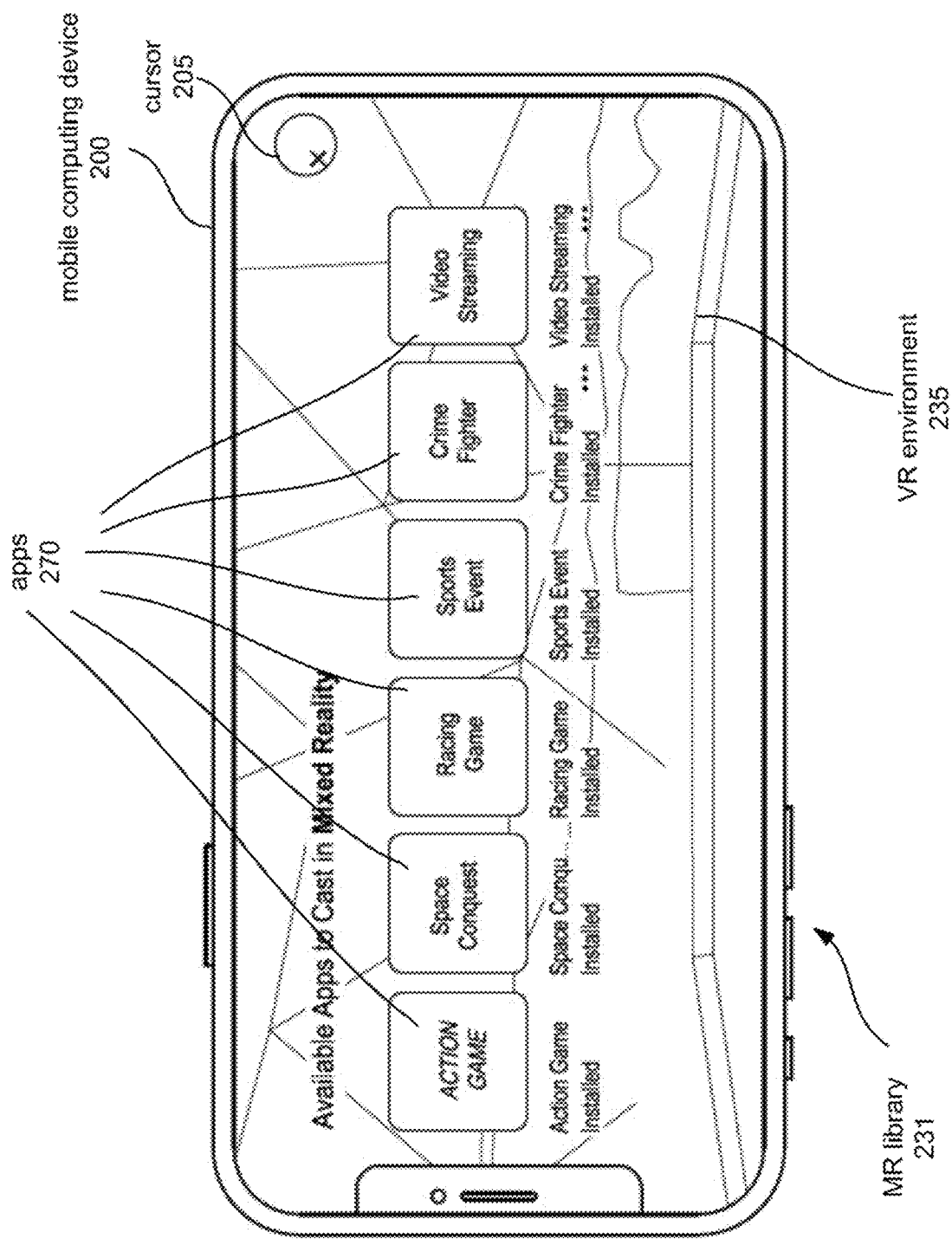
FIG. 6 illustrates an example of the mobile computing device displaying an application library.

FIG. 6 illustrates an example of the mobile computing device 200 displaying an application library. Here, the application library is the MR library 231 displaying one or more applications 270. For example, there may be an action game application, a space conquest application, a racing game, a sports event (e.g., live basketball game), a crime fighter application, and a video streaming application.

Figure 7:
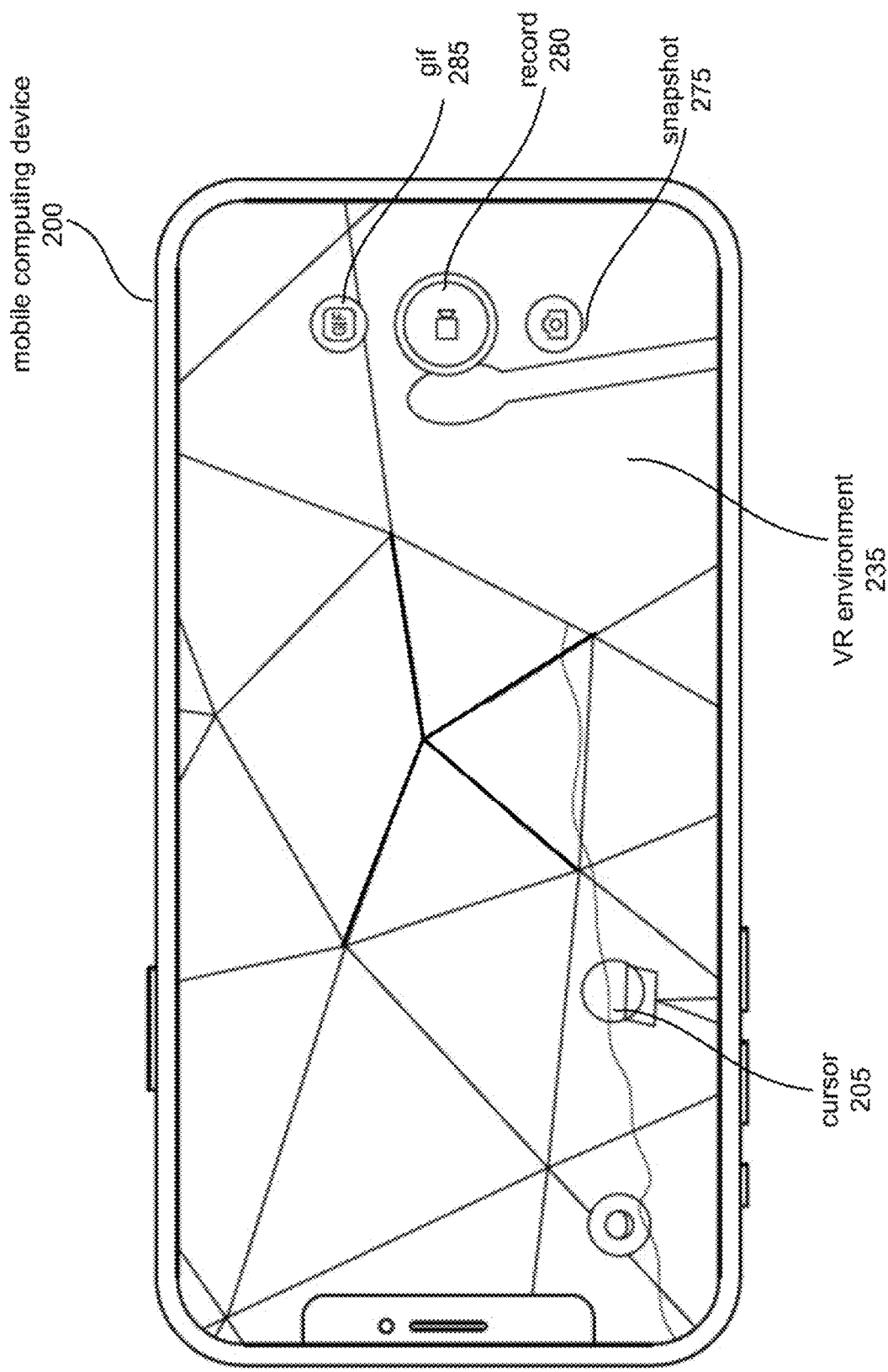
FIG. 7 illustrates an example of the mobile computing device displaying a VR environment.

FIG. 7 illustrates an example of the mobile computing device 200 displaying a VR environment 235. While in the VR environment 235, the user of the mobile computing device 200 may take a snapshot of the VR environment 235 using the snapshot 275 feature. As another example, the user may record the VR environment 235 using the record 280 feature. That is, the mobile computing device 200 may be used to create a video file or to stream the VR environment 235. As another example, the user of the mobile computing device 200 may make a gif using the gif 285 feature. A user of the VR display device 135 may remotely operate the snapshot 275 feature, the record 280 feature, and the gif 285 feature (as well as other features). Further, a user of the VR display device 135 may have the option to view a "live selfie" view (e.g., broadcast of the user wearing the VR display device 135) to see what was captured or recorded by the one or more features. A user of the VR display device 135 and/or a user of the mobile computing device 200 may broadcast captured features to mobile computing devices, web browsers, or other interactive devices of other end users, and the other end users may interact with the user of the VR display device 135 and/or the user of the mobile computing device 200.

Figure 8:
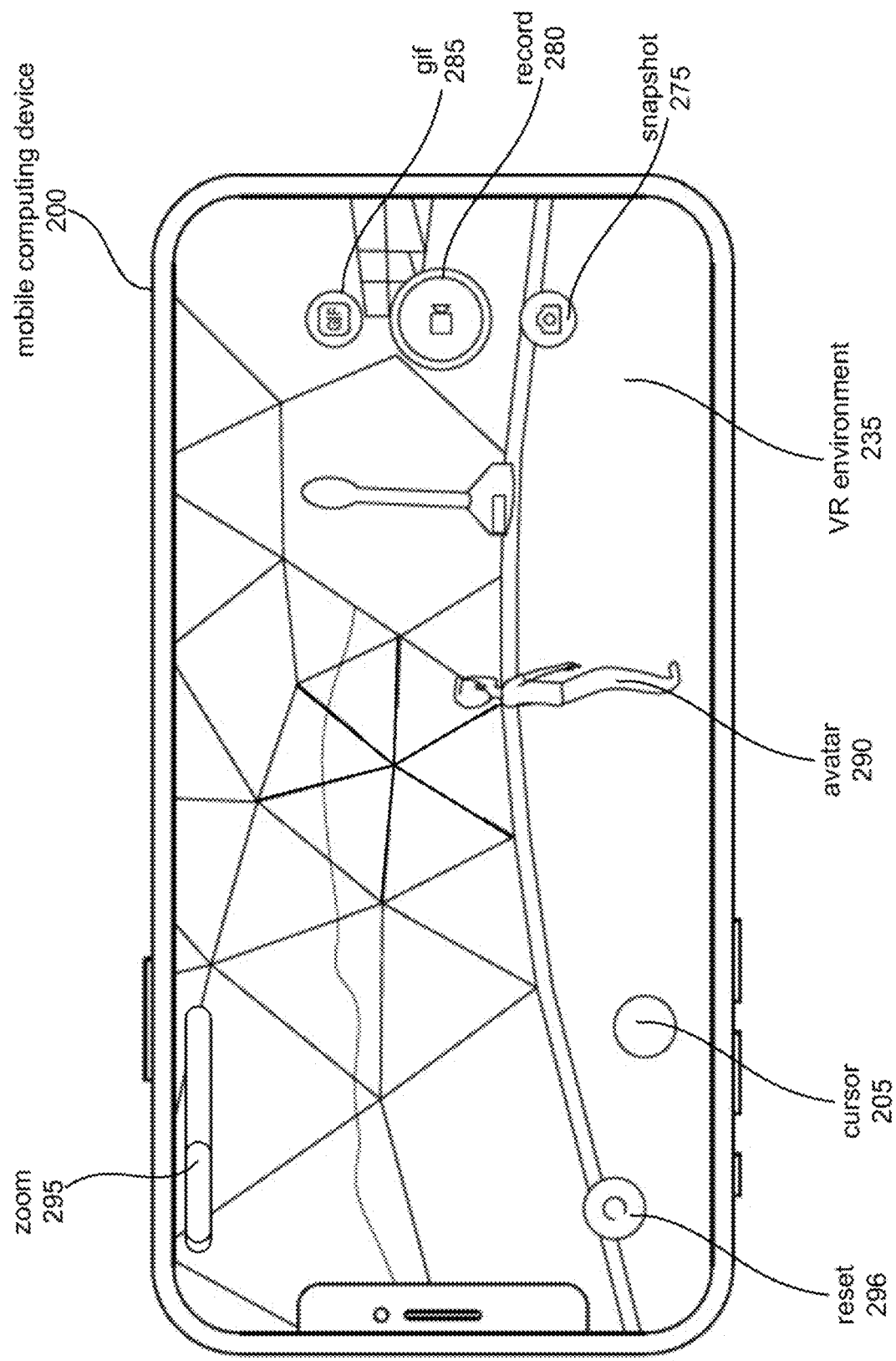
FIG. 8 illustrates an example of the mobile computing device displaying an avatar in the VR environment.

FIG. 8 illustrates an example of the mobile computing device 200 displaying an avatar 290 in the VR environment 235. The avatar 290 may be an avatar representing the first user (e.g., the user 102) wearing the VR display device 135. The user of the mobile computing device 235 may zoom in and out on the avatar 290 in the VR environment 235 using the zoom 295 feature. The user of the mobile computing device 200 may also move around the VR environment 235 by dragging, clicking, pinching, or swiping on the display of the mobile computing device 200 to move around the VR environment 235.

Figure 9:
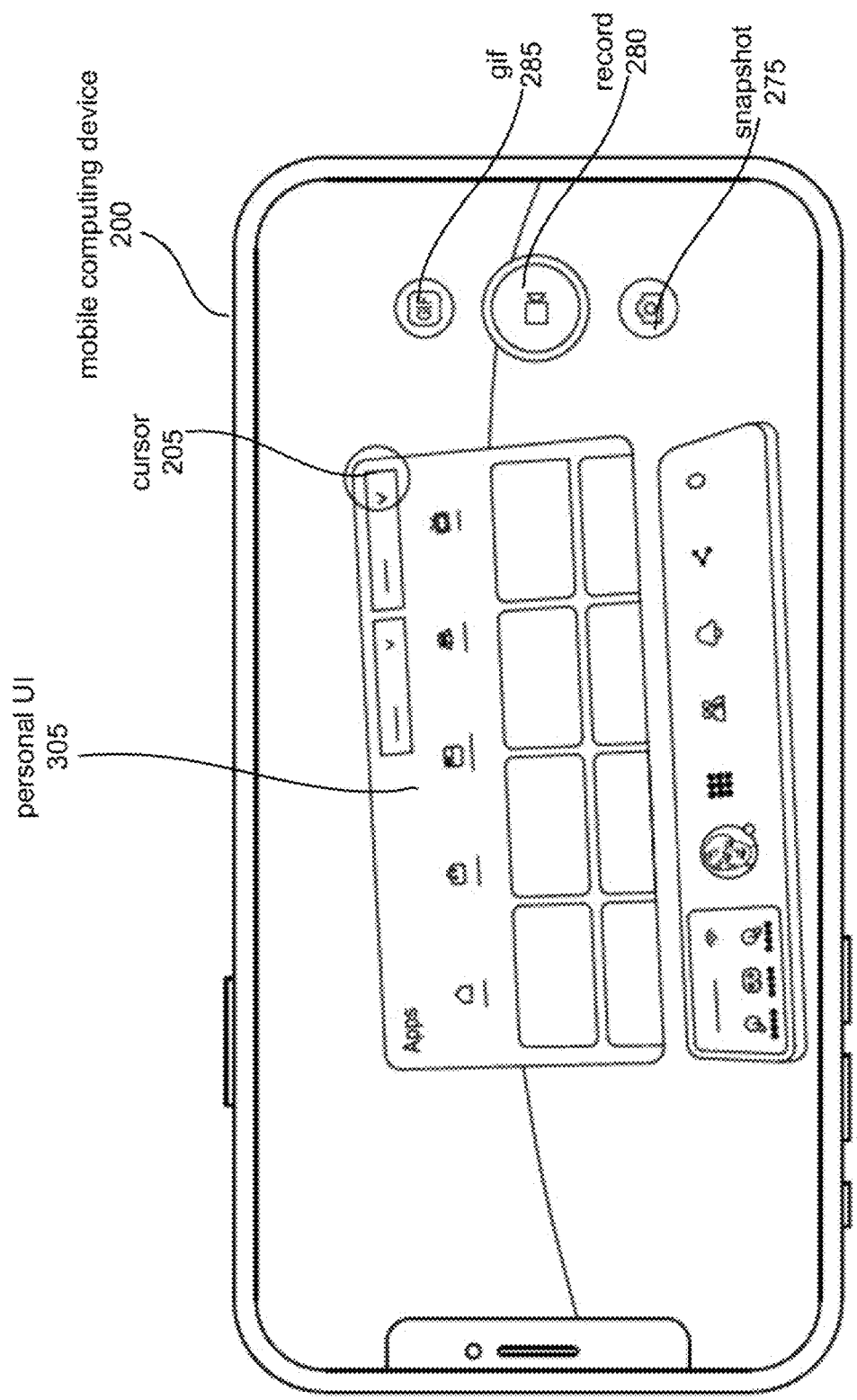
FIG. 9 illustrates an example of the mobile computing device displaying a personal user interface.

FIG. 9 illustrates an example of the mobile computing device 200 displaying a personal user interface (UI) 305. The personal UI 305 may have a first form factor and a first pose with respect to the user (e.g., the user of the mobile computing device and/or the first user). The personal UI 305 may be a virtual object comprising one or more 2D virtual displays. The personal UI 305 may be operable to execute a plurality of applications.

Figure 10:
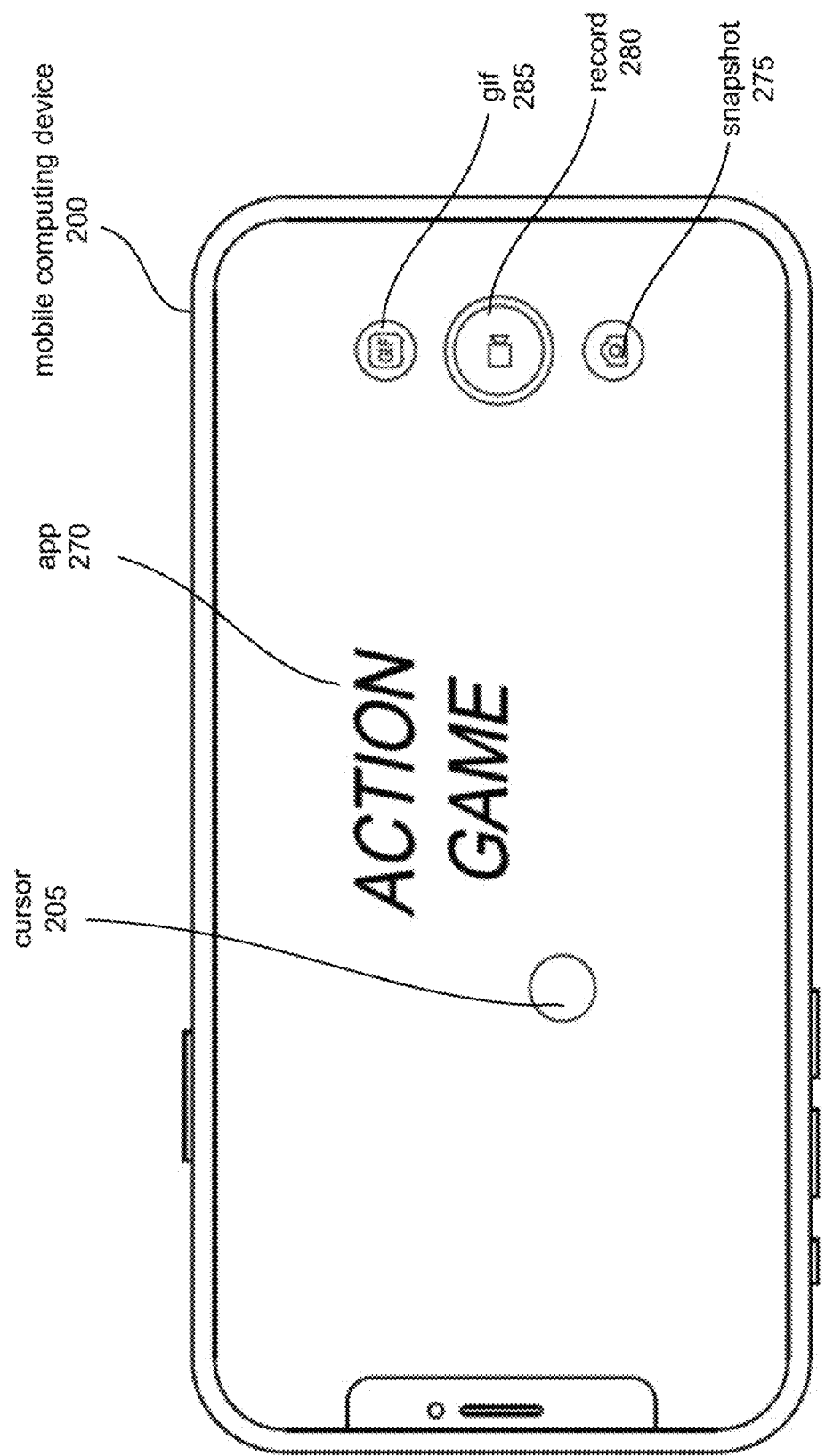
FIG. 10 illustrates an example of the mobile computing device displaying a gaming application.
Figure 11:
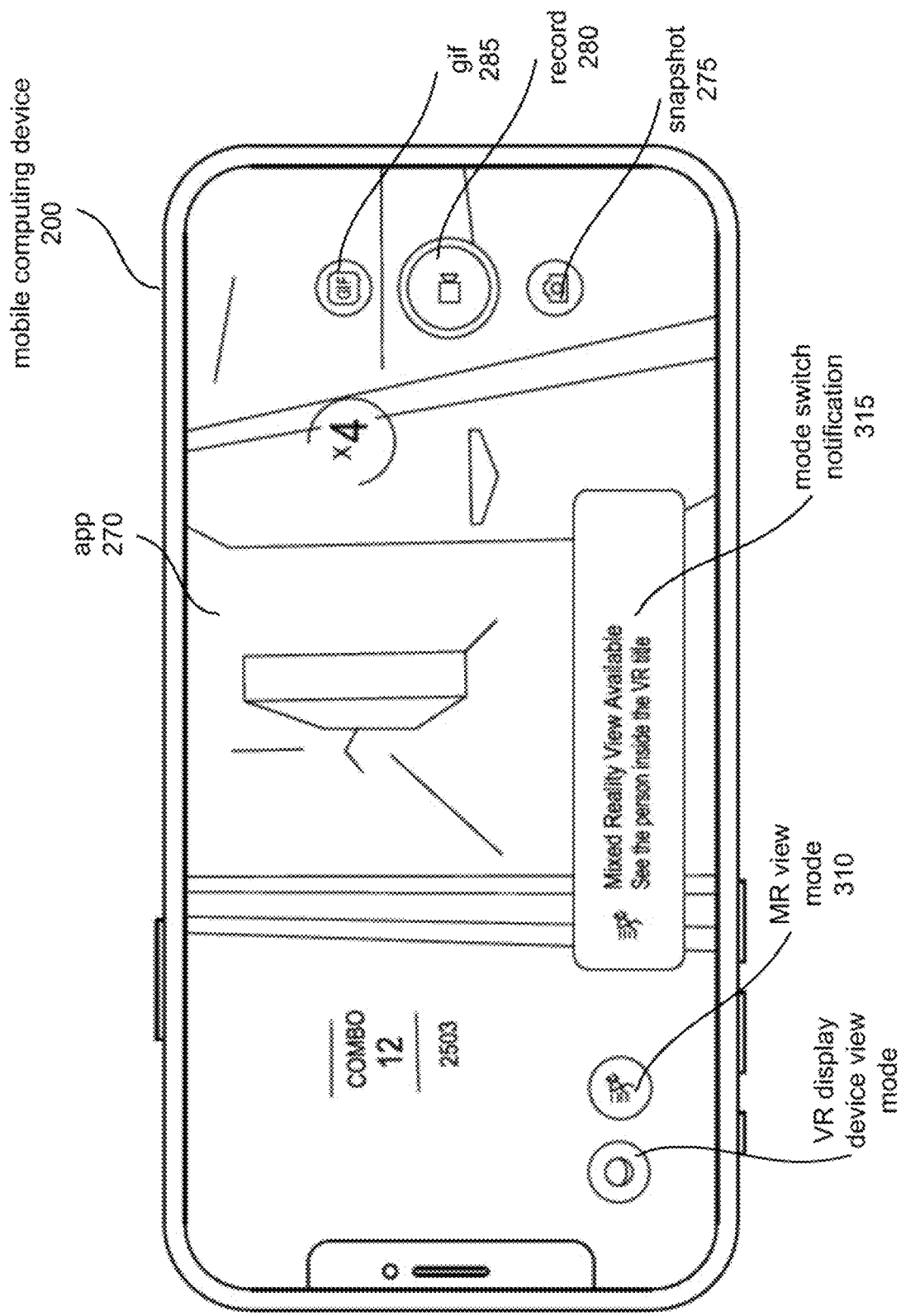
FIG. 11 illustrates an example of the mobile computing device displaying the gaming application where a MR view is available.
Figure 12:
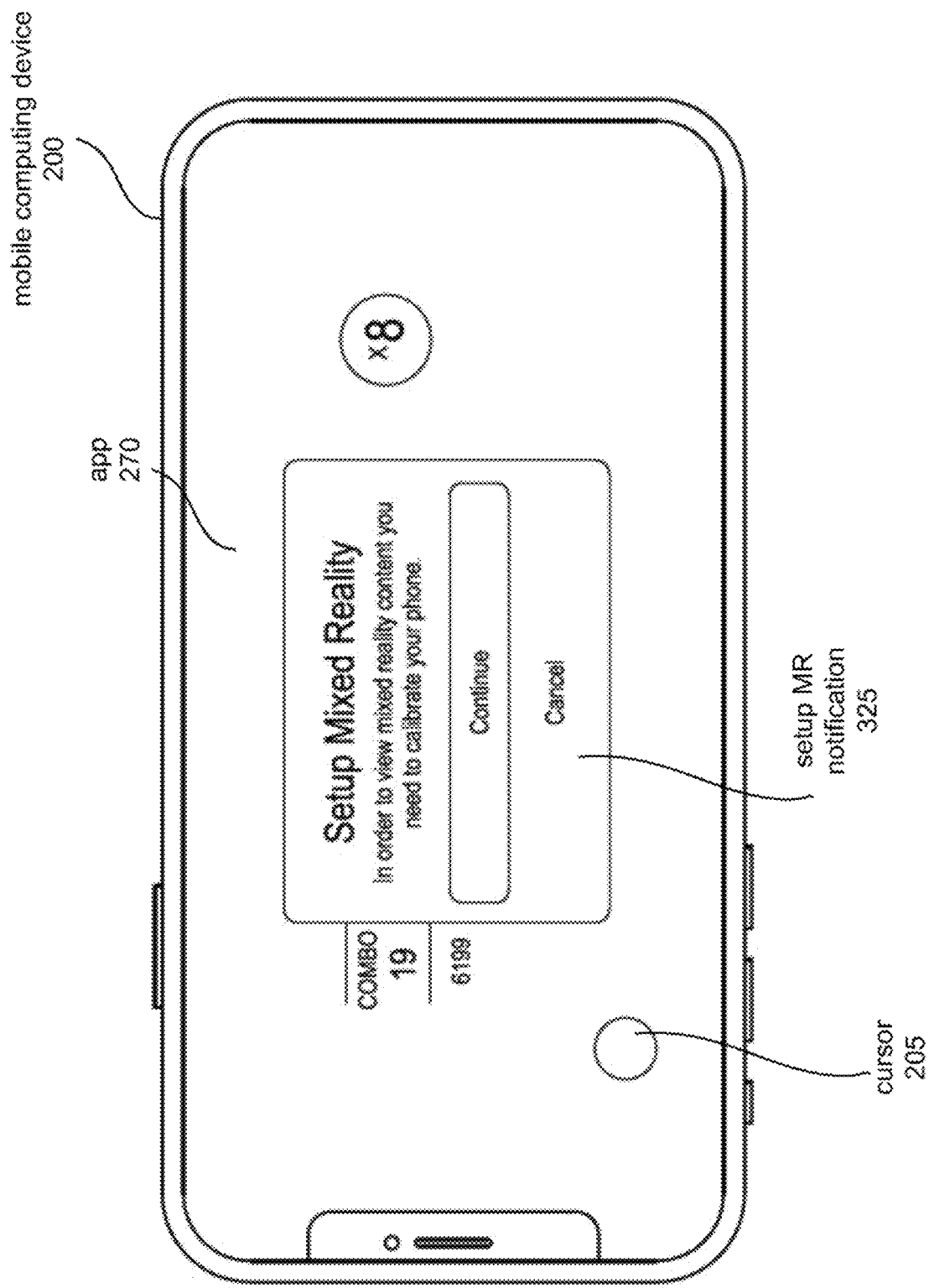
FIG. 12 illustrates an example of the mobile computing device displaying a notification to setup a MR experience.

FIG. 10 illustrates an example of the mobile computing device 200 displaying a gaming application. FIG. 11 illustrates an example of the mobile computing device 200 displaying the gaming application where a MR view is available. For example, the application 270 of FIG. 11 may be the gaming application of FIG. 10. The mobile computing device 200 may indicate that a MR view is available using the mode switch notification 315. That is, the mobile computing device 200 may indicate to the user of the mobile computing device 200 that the user may view a MR view of the a user (e.g., the user of the mobile computing device 200, the first user, another user, etc.) in the VR application. The user of the mobile computing device 200 may select the MR view mode 310 feature to see the first user in the VR environment 235 of the VR application. The user of the mobile computing device 200 may select the VR display device view mode 320 feature to display the VR application from the perspective of the user wearing the VR display device 135. FIG. 12 illustrates an example of the mobile computing device 200 displaying a notification to setup a MR experience. The mobile computing device 200 may display a setup MR notification 325 to enable the user of the mobile computing device 200 to view MR content. The MR setup notification 325 may be presented to the user of the mobile computing device 200 after the user selects the MR view mode 310 and/or the mode switch notification 315 of FIG. 11.

Figure 13:
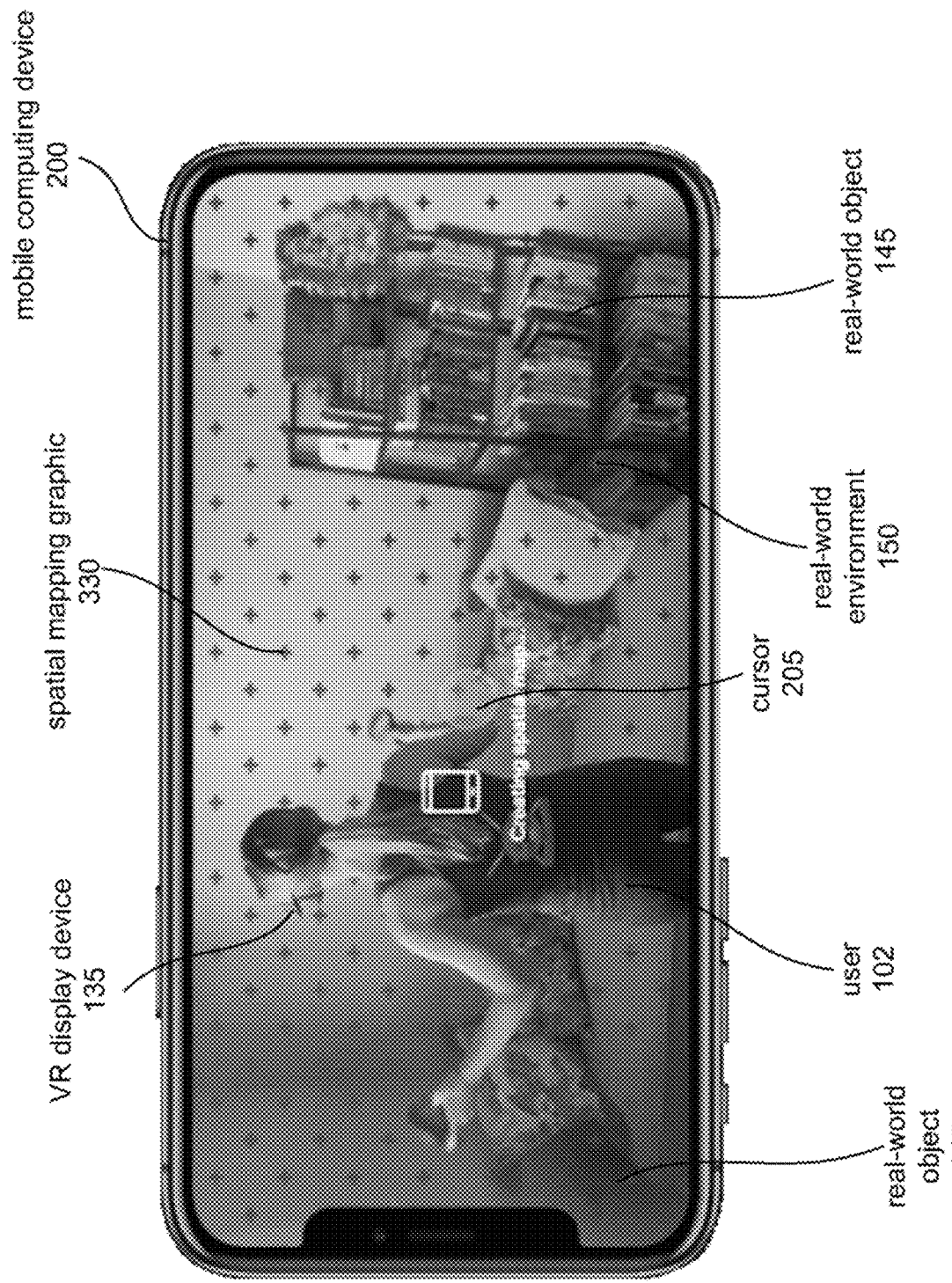
FIG. 13 illustrates an example of the mobile computing device displaying images captured of the first user wearing a VR display device in the real-world environment.

FIG. 13 illustrates an example of the mobile computing device 200 displaying images captures of the first user (e.g., the user 102) wearing a VR display device in the real-world environment 150. The real-world environment may include the user 102, and one or more real-world objects 145 (e.g., furniture, windows, walls, doorframes, etc.) The mobile computing device 200 may display one or more spatial mapping graphics 330 that may be displayed while the VR system 100 generates a feature map (e.g., spatial map) of the real-world environment 150. Within the generated feature map of the real-world environment 150, there may be one or more anchor points corresponding to one or more features in the real-world environment 150. Anchor points with the field of view of the one or more cameras of the VR display device 135 and the mobile computing device 200 may be used to determine the relative locations of the devices with respect to each other. As an example and not by way of limitation, features of real-world objects 145 (e.g., corner of a bookshelf or end of a sofa) or features of fixed, stationary, or permanent fixtures (e.g., corner of a window or corner of a wall) within the field of view of both the VR display device 135 and the mobile computing device 200 may serve as an anchor point.

In particular embodiments, one or more cameras of the mobile computing device 200 may capture one or more images of the first user (e.g., the user 102) wearing the VR display device 135 in the real-world environment 150. The VR system 100 may instruct a camera of the mobile computing device 200 to capture one or more images of the real-world environment comprising the first user wearing the VR display device 135. There may be one or more cameras on the mobile computing device 200 having a plurality of pixel sensors (or other suitable optical sensors) to capture the image (comprising a plurality of pixels) of the real-world environment, where the plurality of pixels may be captured by any of the one or more cameras. The image capture may be a full resolution image capture of the first user and one or more real-world objects in the real-world environment 150. As an example and not by way of limitation, the mobile computing device 200 may capture an image of the user 102 wearing the VR display device 135 in the real-world environment 150. In particular embodiments, the camera of mobile computing device 200 may capture features of the first user and one or more other users. For example, the mobile computing device 200 may determine the pose (e.g., x-y-z position and r-p-y orientation) of the first user and/or the VR display device 135 with respect to the mobile computing device 200. Although this disclosure describes capturing one or more images in a particular manner, this disclosure contemplates capturing one or more images in any suitable manner.

In particular embodiments, the mobile computing device 200 may receive from the VR system 100 one or more anchor points in the real-world environment 150 identified from the one or more images. The anchor points may correspond to any real-world object 145 or distinguishing feature of the real-world environment 150. For example, the anchor point may correspond to a stationary or permanent fixture (e.g., fixed objects) in the real-world environment 150, such as a doorway, a window, an item of furniture, etc. In particular embodiments, the anchor points may be used to determine the pose of the mobile computing device 200 with respect to the VR display device 135. The anchor point may be used to calibrate the pose of the mobile computing device 200 and/or the VR display device 135, by localizing the mobile computing device 200 and the VR display device 135 with respect to the identified anchor points. The VR system 100 may automatically perform an initial localization process (e.g., calibration process) to localize the mobile computing device 200 and the VR display device 135 with respect to the real-world environment and/or with respect to each other.

In particular embodiments, determining the pose of the mobile computing device 200 may comprise detecting that the mobile computing device 200 has moved (e.g., using position sensors such as accelerometers, or image processing algorithms determining a change in the position of the mobile computing device 200 based on a comparison of images). Then, an updated pose of the mobile computing device 200 with respect to the VR display device 135 may be determined based on the one or more anchor points. That is, the mobile computing device 200 may relocalize its pose based on a determination of the location of the mobile computing device 200 with respect to the one or more anchor points. The VR system may generate, in real-time responsive to detecting the mobile computing device 200 has moved, an updated MR rendering of the first user (e.g., the user 102) in the VR environment 235. The updated MR rendering of the first user may be based on the updated pose of the mobile computing device 200 with respect to the VR display device 135. That is, the pose of the mobile computing device 200 with respect to the VR display device 135 may be determined based on a triangulation between one or more of the anchor points, the mobile computing device 200 (e.g., the one or more cameras of the mobile computing device 200), and the VR display device 135. Thus, based on the updated pose of the moved mobile computing device 200, the VR system 100 may generate, and the mobile computing device 200 may display, an updated MR rendering of the first user in the VR environment 235. For example, if the mobile computing device 200 has moved to the left of the user 102 wearing the VR display device 135, the MR rendering will accordingly display the mobile computing device 200 has moved to the left of the user 102 wearing the VR display device 135. Thus, the pose of the mobile computing device 200 and the VR display device may be determined with respect to one another as well as with respect to the real-world environment 150. The anchor points may be used to continuously or periodically update the respective poses of the mobile computing device 200 and the VR display device 135 by tracking the relative locations of the mobile computing device 200 and the VR display device 135 (e.g., by using simultaneous localization and mapping techniques). A feature map of the real-world environment 150 generated by the VR system 100 may be used to determine one or more anchor points corresponding to features within the feature map. The feature map and anchor points may be made and continuously updated by the VR system 100 of the VR display device 135. A technical advantage of the embodiments may include allowing the user of the mobile computing device 200 to move the mobile computing device 200 to other poses (e.g., positions and orientations), and the VR system 100 may dynamically update the MR rendering in real-time without the need for an additional setup and re-localization process of the mobile computing device 200. That is, the VR system 100 may only have to reference the feature map to relocalize the mobile computing device 200, instead of relocalizing with respect to the VR display device 135. Thus, this may have the advantage of reducing the computing and processing power required by the mobile computing device 200. That is, the VR display device 135 may track its pose relative to the anchor points in the feature map, and the mobile computing device 200 may also track its pose relative to the same anchor points in the feature map. Although this disclosure describes localizing devices in a particular manner, this disclosure contemplates localizing devices in any suitable manner.

In particular embodiments, the mobile computing device 200 may transmit a pose of the mobile computing device 200 to the VR system 100 of the VR display device 135. That is, the mobile computing device 200 may send the information such as the pose of the mobile computing device 200 to the VR system 100. The mobile computing device 200 may further transmit information to the VR system 100 such as the one or more images of the first user wearing the VR display device 135. As an example and not by way of limitation, and with reference to FIG. 13, the mobile computing device 200 may transmit the image of the user 102 in the real-world environment 150 to the VR system 100 on the VR display device 135. Although this disclosure describes transmitting pose information in a particular manner, this disclosure contemplates transmitting pose information in any suitable manner.

Figure 14:
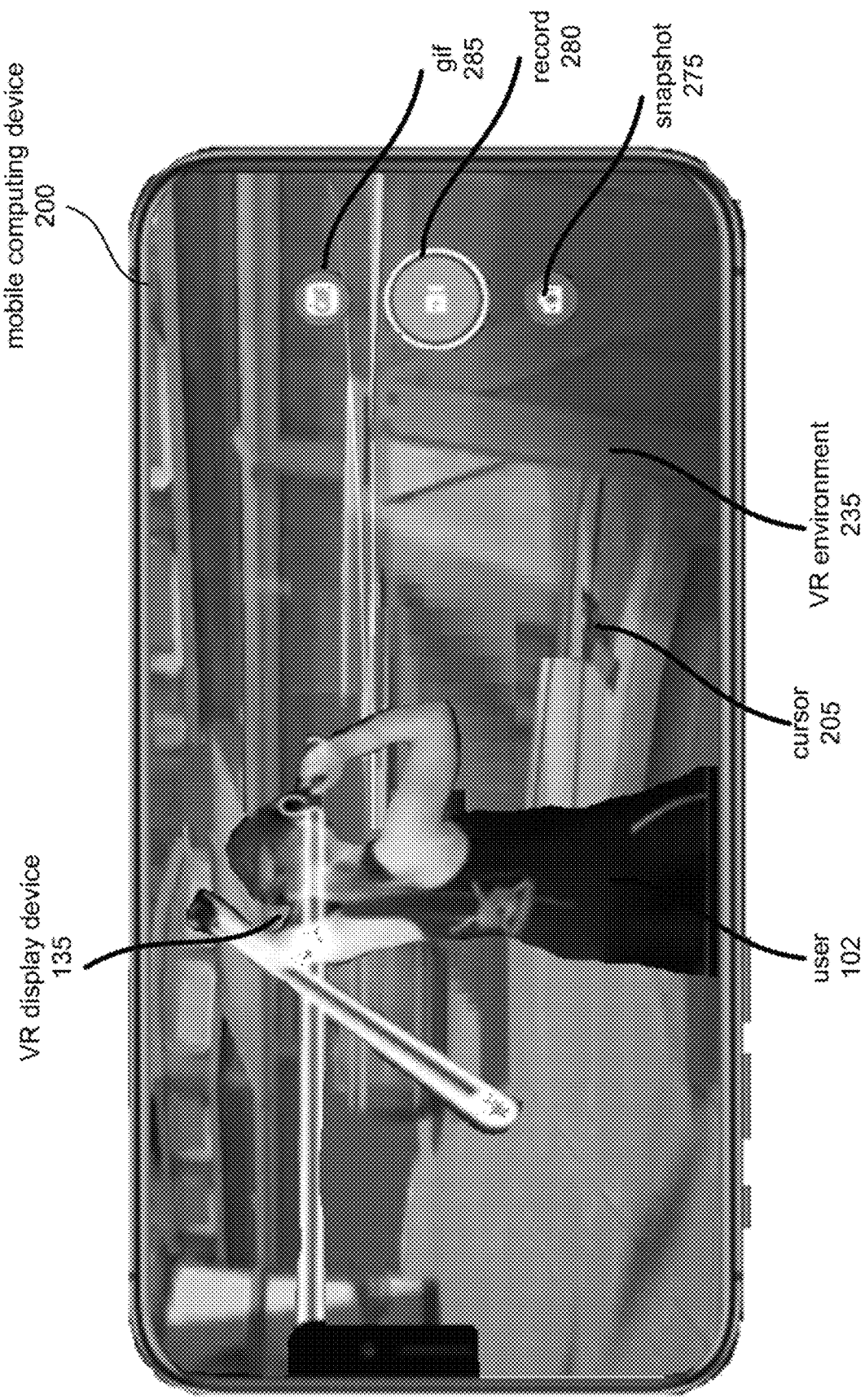
FIG. 14 illustrates an example of the mobile computing device displaying a MR view of the first user in the VR environment.

FIG. 14 illustrates an example of the mobile computing device 200 displaying a MR view of the user 102 in the VR environment 235. The user 102 wearing the VR display device 135 may be playing a VR gaming application set in the VR environment 235. The user of the mobile computing device 200 may use the cursor 205 to view the user 102 in the VR environment 235, and to explore the VR environment 235. The user of the mobile computing device 200 may use the snapshot 275 feature to take a photo of the user 102 in the VR environment 235, use the record 280 feature to record the user 102 in the VR environment 235, or use the gif 285 feature to make a gif of the user 102 in the VR environment 235.

In particular embodiments, the mobile computing device 200 may receive from the VR system 100 a VR rendering of a VR environment 235. The VR rendering may be from the perspective of the mobile computing device 200 with respect to the VR display device 135. The perspective of the mobile computing device 200 may be determined from the pose of the mobile computing device 200 with respect to the VR display device 135. As an example and not by way of limitation, and with reference to FIG. 14, the mobile computing device 200 may display a VR rendering of the VR environment 235 from the perspective of the mobile computing device 200 based on the mobile computing device 200 having a pose with respect to the VR display device 135. The mobile computing device 200 and the VR display device 135 may be time synchronized so the rendering of the VR environment 235 displayed on the VR display device 135 is received on the same timestamp of the rendering of the VR environment displayed on the mobile computing device 200. Through this synchronization, the mobile computing device 200 and the VR display device 135 may seamlessly view the same VR environment 235. Although this disclosure describes receiving a VR rendering in a particular manner, this disclosure contemplates receiving a VR rendering in any suitable manner.

In particular embodiments, the mobile computing device 200 may receive from the VR system an indication the first user (e.g., the user 102) has activated a particular VR application on the VR system 100. As an example and not by way of limitation, the first user wearing the VR display device 135 may select a VR gaming application. Responsive to receiving the indication the first user has activated a particular VR application on the VR system 100, the mobile computing device 200 may present a notification that the first user wearing the VR display device 135 has started the particular VR application. As an example and not by way of limitation, the mobile computing device 200 may notify the user of the mobile computing device 200 that the first user has selected a VR gaming application (e.g., via a popup banner or alert on the display of the mobile computing device 200). The user of the mobile computing device 200 may then select an option to view a MR view of the first user in the VR environment 235 of the VR gaming application (e.g., via the mode switch notification 315 in FIG. 11). Although this disclosure describes prompting a VR experience in a particular manner, this disclosure contemplates prompting a VR experience in any suitable manner.

Figure 15:
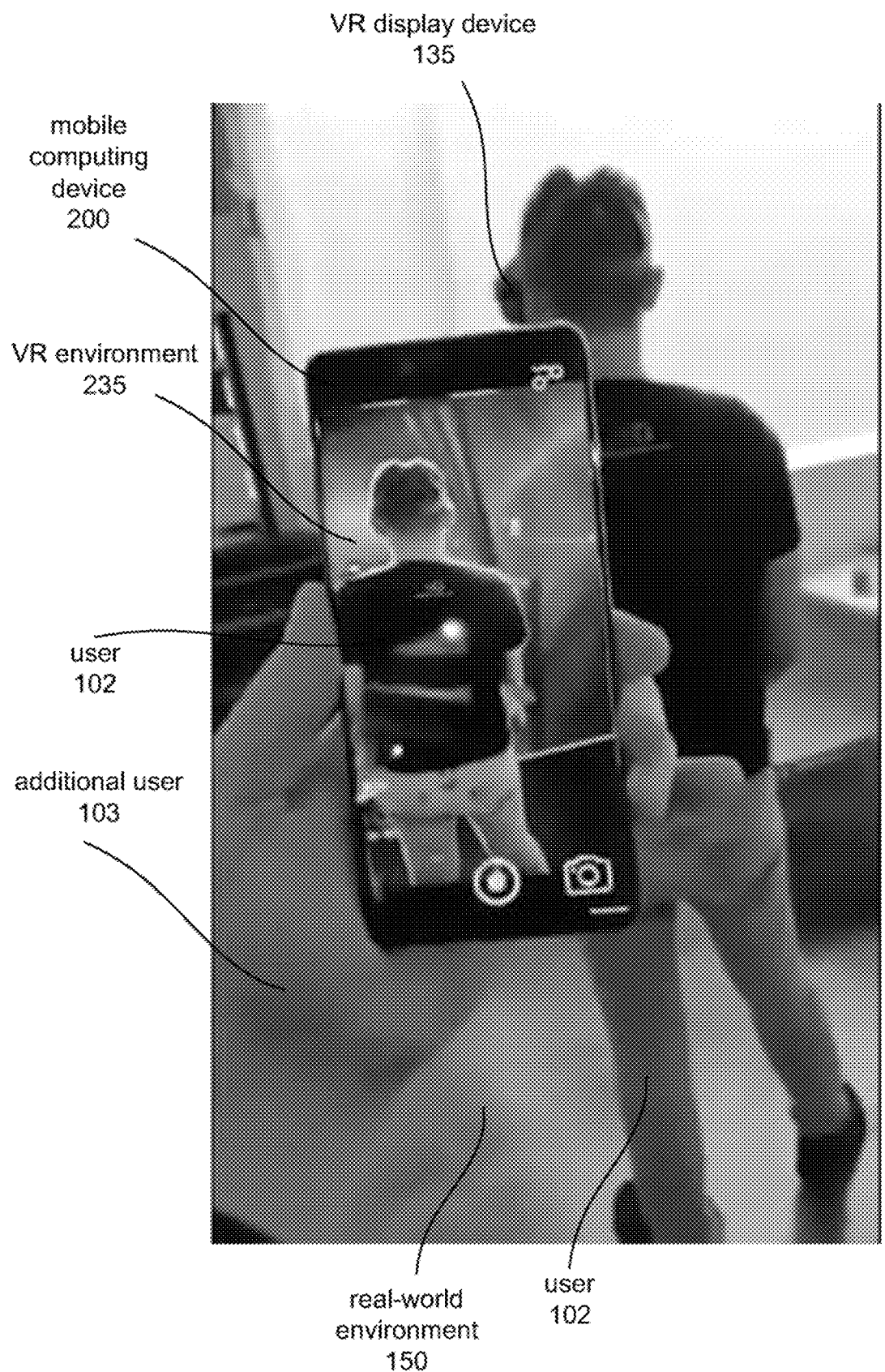
FIG. 15 illustrates an example of the mobile computing device displaying a MR view of the first user in the VR environment from a first pose.
Figure 16:
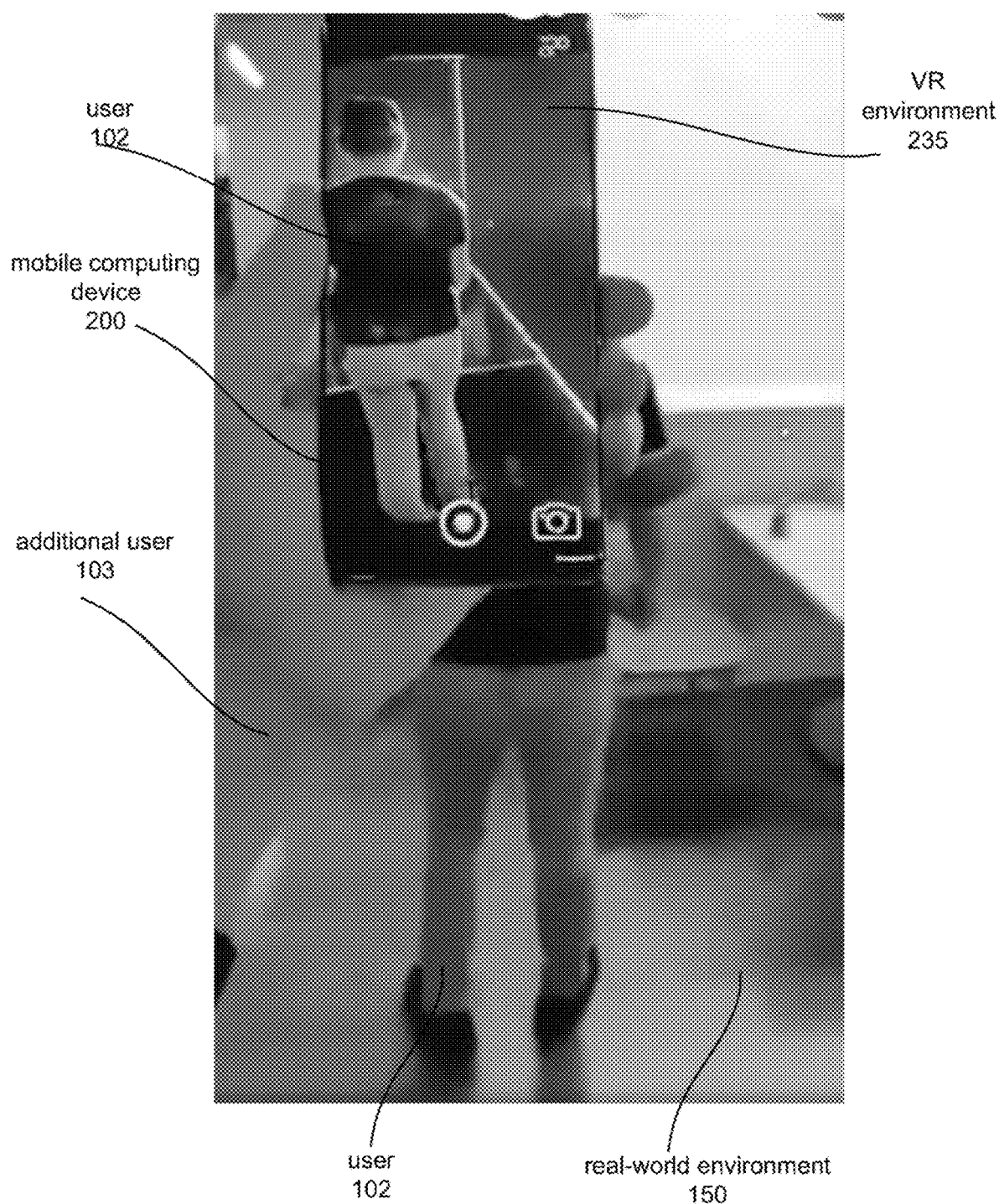
FIG. 16 illustrates an example of the mobile computing device displaying a MR view of the first user in the VR environment from a second pose.
Figure 17:
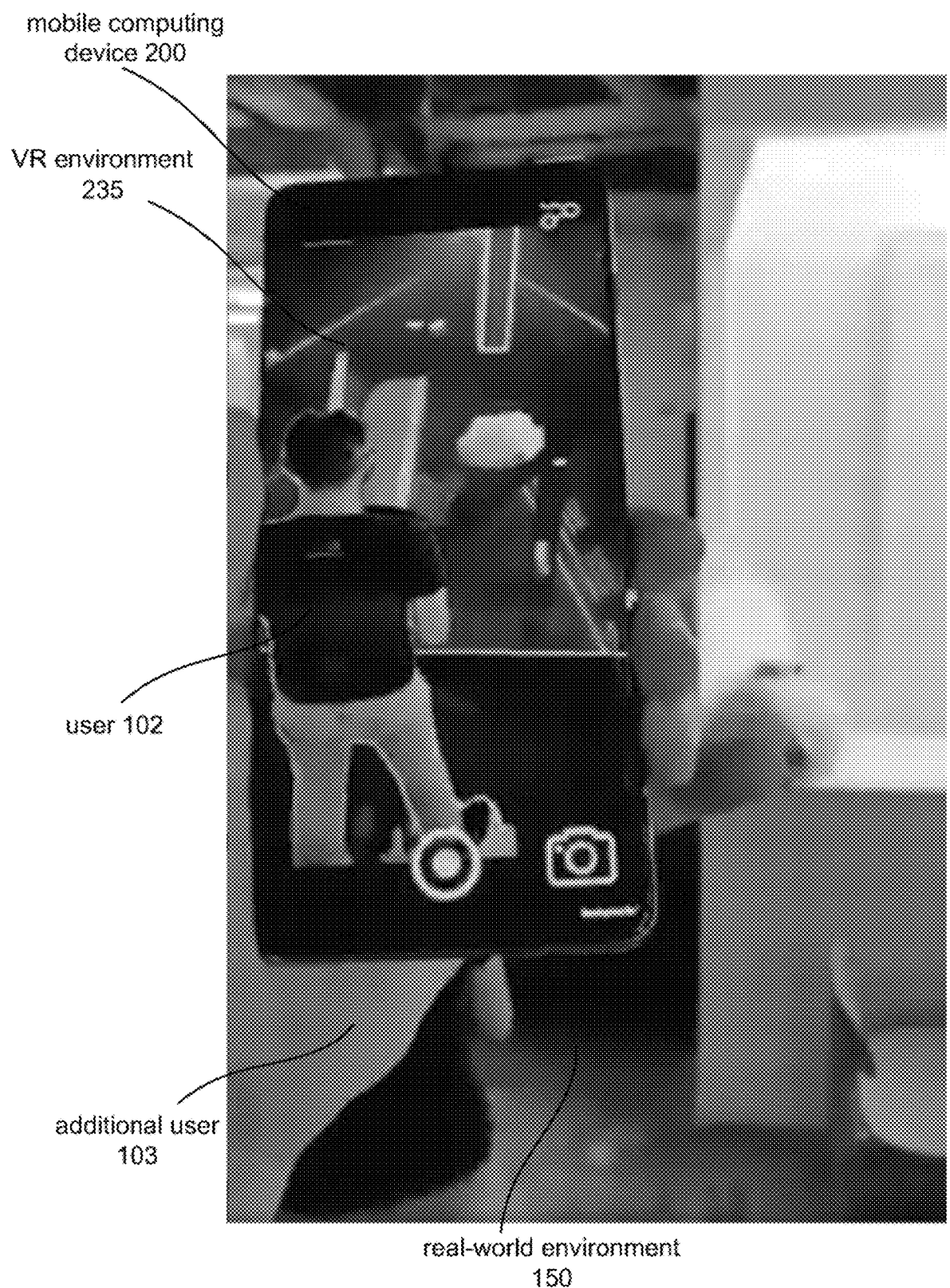
FIG. 17 illustrates is an illustration of the mobile computing device displaying a MR view of the first user in the VR environment from a third pose.

FIGS. 15, 16, and 17 illustrate examples of the mobile computing device 200 displaying MR views of the first user 102 in the VR environment 235 from a first, second, and third pose, respectively. The mobile computing device 200 displays the first user segmented from the one or more images, and rendered in the VR environment 235. A user of the mobile computing device 200 (e.g., the additional user 103) may be using the mobile computing device 200 to view the user (e.g., the user 102) wearing the VR display device 135 in the real-world environment 150. The mobile computing device 200 may display a "cutout" of the user 102 overlaid on the VR environment 235 (e.g., where the user 102 is in a VR gaming application). The VR environment 235 displayed on the mobile computing device 200 may correspond to the VR environment 235 displayed on the VR display device 135 worn by user 102. As the additional user 103 and/or the mobile computing device 200 move, and as the user 102 and the VR display device 135 move, the display of the mobile computing device 200 updates the position of the user 102 as well as the pose of the mobile computing device 200 "within" the VR environment 235. Thus, as the mobile computing device 200 moves around in the real-world environment 150 (e.g., the mobile computing device 200 moves from a first pose to an updated pose), the MR rendering of the first user 102 in the VR environment 235 is automatically updated in real-time to display the first user 102 in the VR environment 235 relative to and according to the updated pose of the MR computing device 200.

In particular embodiments, the first user (e.g., the user 102) may be segmented from the one or more images. That is, an outline, body, or "cutout" of the first user may be segmented from the background real-world environment 150 to be overlaid or superimposed onto the VR environment 235 displayed on the mobile computing device 200. As an example and not by way of limitation, the outline or body of the user 102 within the real-world environment 150 may be identified and determined using a segmentation algorithm or an image processing algorithm and the outline or body of the user 102 may be extracted or segmented from the image containing the user 102 in the real-world environment 150. Additionally, in particular embodiments, only the first user may be segmented from the one or more images. That is, the VR system 100 may exclusively segment the first user, and ignore (e.g., not segment) other users from the one or more images. In particular embodiments, the VR system 100 may segment the user wearing the VR display device 135 (e.g., the VR system 100 creates a bounding volume around the VR display device 135 using depth estimates to determine which user to segment). Segmenting the first user addresses the technical challenge of allowing dynamic movement of the mobile computing device 200 and maintaining the image of the first user immersed in the VR environment 235 within the frame of the image on the mobile computing device 200. Thus, the user of the mobile computing device 200 may maintain the MR rendering of the first user in the VR environment 235 without the need of a static camera fixed on the first user. The segmentation of the first user may be stored as segmentation data. The segmentation data may be retained or maintained at the VR system 100. Retention of the segmentation data may allow MR or augmented reality (AR) effects to be applied to the segmentation of the first user. For example, if the first user is in a VR sports game environment, MR or AR effects may be applied to the clothing worn by the segmented first user such that the first user appears to wear a sports team jersey. Although this disclosure describes segmenting a user from one or more images in a particular manner, this disclosure contemplates segmenting a user from one or more images in any suitable manner.

In particular embodiments, the VR system 100 and at the mobile computing device 200 may generate, in real-time responsive to capturing the one or more images containing the first user (e.g., the user 102), a MR rendering of the first user (e.g., the user 102) in the VR environment 235. The MR rendering of the first user may be based on a compositing of the segmented one or more images of the first user and the VR rendering. That is, the MR rendering may include the first user (e.g., the user 102) that was segmented from the one or more images of the user 102 in the real-world environment 235 within the FOV of the mobile computing device 200, and rendered (e.g., superimposed or overlaid) onto the VR environment 235 displayed on the mobile computing device 200. The user of the mobile computing device 200 (e.g., the additional user 103) may view a 2D rendering of the user 102 superimposed onto the VR environment 235 as the user 102 moves and/or interacts with the VR environment 235 as displayed on the VR display device 135. In particular embodiments, the mobile computing device 200 may be used to interact with the VR environment 235 via the MR rendering of the user 102 in the VR environment 235 as displayed on the mobile computing device 200. That is, the user (e.g., the additional user 103) of the mobile computing device 200 may be able to view and interact with the user 102 as the user 102 moves within or interacts with the VR environment 235. The additional user 103 of the mobile computing device 200 may move around and interact with the VR environment 235 independent of the user 102 wearing the VR display device 135. For example, the user 102 may play a VR gaming application, and the additional user 103 of the mobile computing device 200 may view the VR environment 235 that is behind the user 102. The VR system may composite the one or more images may be performed at either the mobile computing device 200, or at the VR display device 135. A technical advantage of the embodiments may include generating a MR rendering of the first user (e.g., the user 102) in the VR environment 235 onto a separate display (such as the mobile computing device 200) without the use of a green screen or other specialized gear.

A technical challenge may include interacting with the generated MR and VR content without the need of specialized equipment, for example without requiring the user of the mobile computing device 200 to use specialized VR gaming equipment to interact with the first user in a VR gaming application. The solution presented by the embodiments disclosed herein to address this challenge may be to utilize the rendering and spatial mapping capabilities of the VR system, allowing the user of the mobile computing device 200 to interact with the generated MR and VR content via the mobile computing device 200. That is, the user of the mobile computing device 200 may interact with the first user in the VR environment 235 using only their mobile computing device 200 (e.g., their smartphone). For example, the user of the mobile computing device 200 may click an icon or button on the display of the mobile computing device 200 to hurl an obstacle for the first user to interact with in the VR gaming application. Interacting with the VR environment 235 may comprise one or more of modifying a VR object in the VR environment 235, creating a VR object in the VR environment 235, modifying a MR object in the VR environment 235, creating a MR object in the VR environment 235, modifying one or more attributes of VR environment 235, changing the VR environment 235 from a first VR environment to a second VR environment, changing a VR application, recording the MR rendering, or streaming the MR rendering. In particular embodiments, the mobile computing device 200 may transmit, in real-time, the generated MR rendering of the first user in the VR environment 235 to an online social network for live display to one or more additional users. That is, the mobile computing device 200 may live-stream the generated MR rendering (e.g., using the record 280 feature button) on an online social network or other streaming service. Additionally, user of the mobile computing device 200 may interact with the VR environment by creating a VR avatar of a second or additional user (e.g., the additional user 103) corresponding to the user of the mobile computing device 200. Thus, the user of the mobile computing device 200 may interact with the first user in the same VR environment 235 (for example, the user of the VR display device 135 and the user of the mobile computing device 200 may "sit" on the same VR couch and watch a movie together). The user of the mobile computing device 200 may also interact with a VR avatar of another user (different from the user of the VR display device 125 and the user of the mobile computing device 200). In particular embodiments, and with reference to FIG. 11, the mobile computing device 200 may be used to toggle, responsive to a selection on the mobile computing device 200 (e.g., via selection by the cursor 205), between the VR rendering and the MR rendering. The mobile computing device 200 may be used to select between a VR rendering of the VR environment 234 from the perspective of the first user (e.g., via selection of the VR display device view mode 320), and the MR rendering of the first user in the VR environment 235 from the perspective of the mobile computing device 200 with respect to the VR display device 135 (e.g., via selection of the MR view mode 310). Although this disclosure describes generating a MR rendering, this disclosure contemplates generating a MR rendering in any suitable manner.

Figure 18:
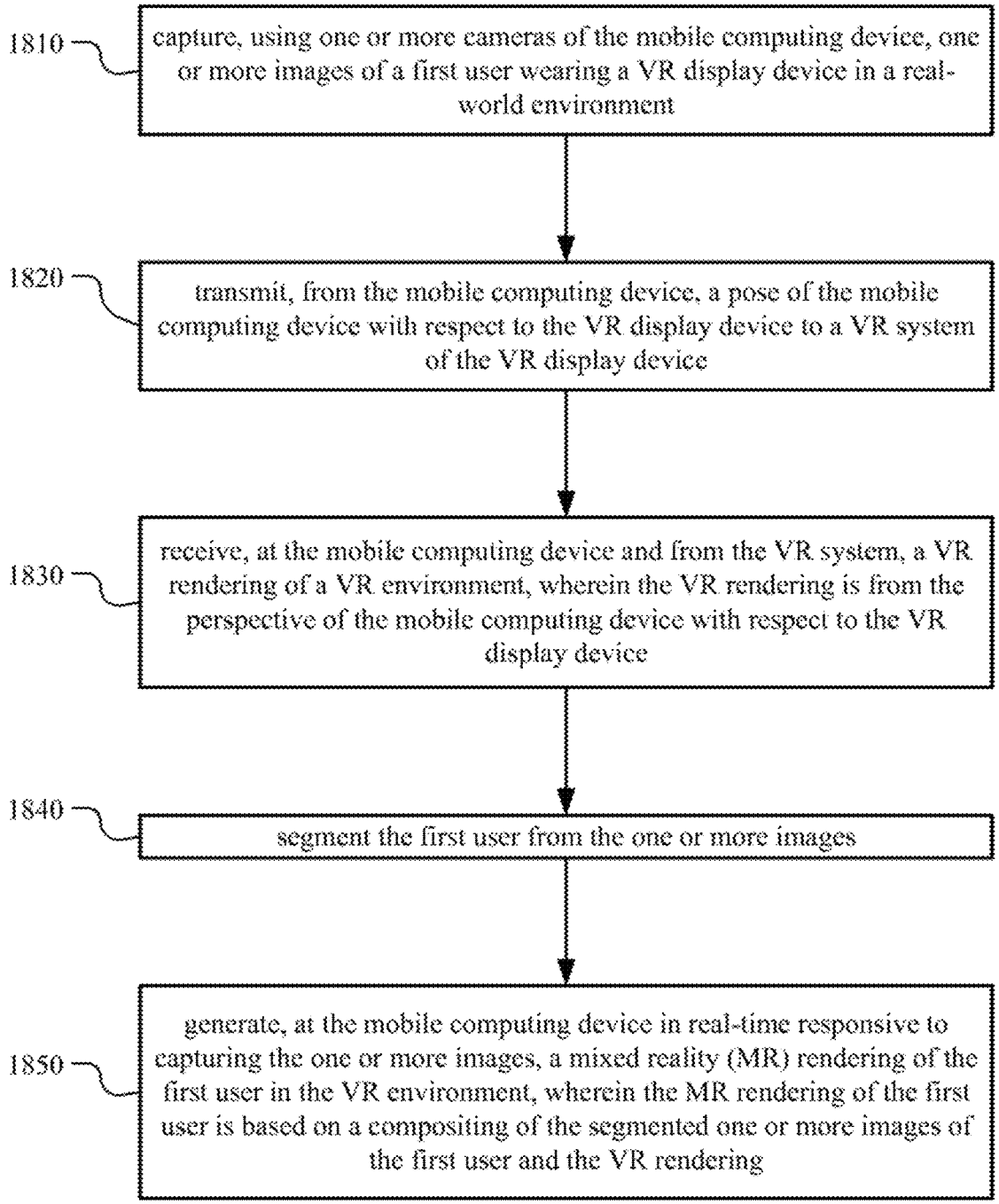
FIG. 18 illustrates an example method for generating MR renderings.

FIG. 18 illustrates an example method 1800 for generating MR renderings. The method may begin at step 1810, where one or more cameras of a mobile computing device may capture one or more images of a first user wearing a VR display device 135 in a real-world environment. At step 1820, the mobile computing device may transmit a pose of the mobile computing device to a VR system of the VR display device 135. At step 1830, the mobile computing device may receive from the VR system a VR rendering of a VR environment. The VR rendering may be from the perspective of the mobile computing device with respect to the VR display device 135. At step 1840, the first user may be segmented from the one or more images. At step 1850, the mobile computing device may generate, in real-time responsive to capturing the one or more images, a MR rendering of the first user in the VR environment. The MR rendering of the first user may be based on a compositing of the segmented one or more images of the first user and the VR rendering. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for generating MR renderings including the particular steps of the method of FIG. 18, this disclosure contemplates any suitable method for generating MR renderings including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Figure 19:
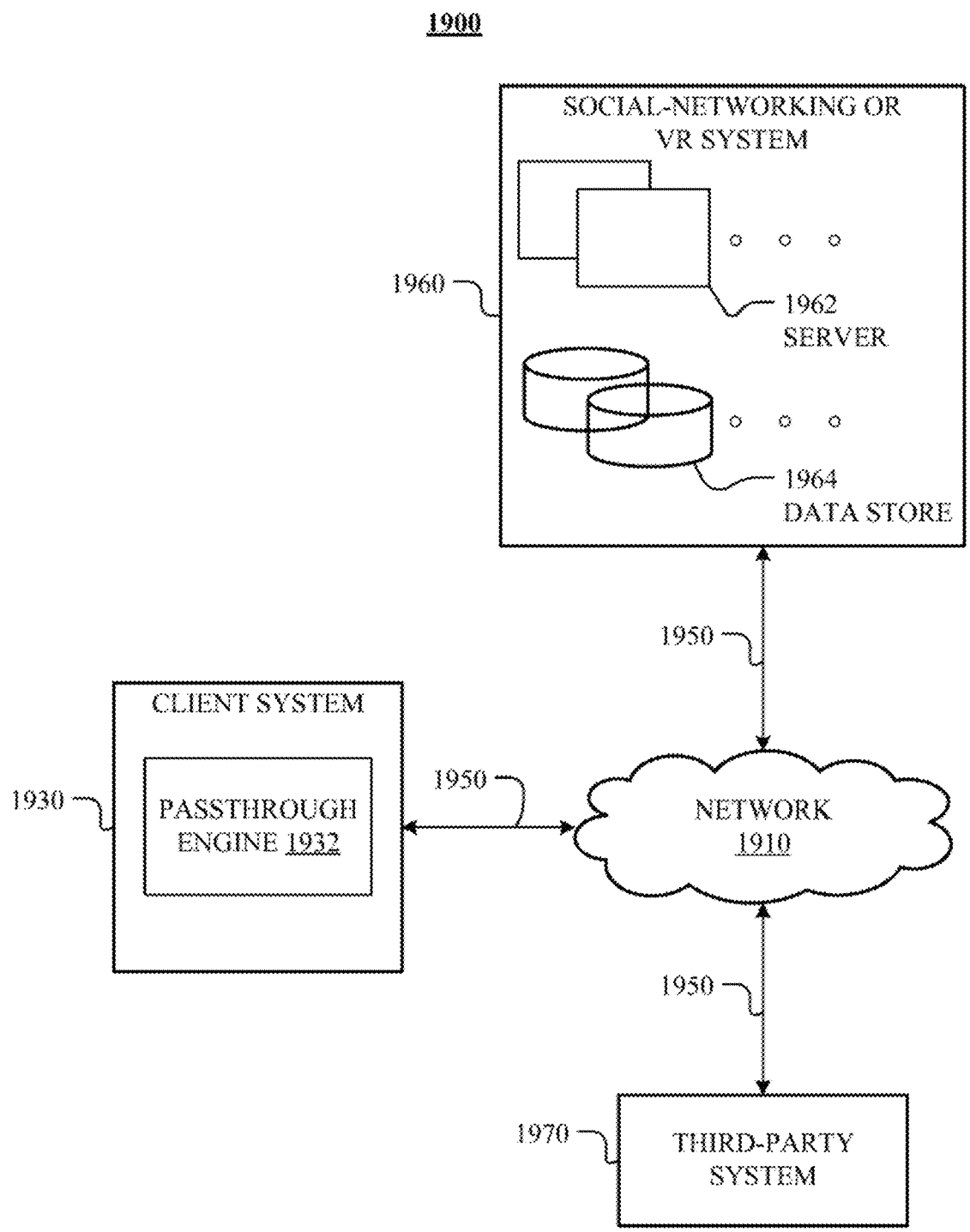
FIG. 19 illustrates an example network environment associated with a social-networking system.

FIG. 19 illustrates an example network environment 1900 associated with a social-networking system. Network environment 1900 includes a client system 1930, a social-networking system 1960, and a third-party system 1970 connected to each other by a network 1910. Although FIG. 19 illustrates a particular arrangement of client system 1930, social-networking system 1960, third-party system 1970, and network 1910, this disclosure contemplates any suitable arrangement of client system 1930, social-networking system 1960, third-party system 1970, and network 1910. As an example and not by way of limitation, two or more of client system 1930, social-networking system 1960, and third-party system 1970 may be connected to each other directly, bypassing network 1910. As another example, two or more of client system 1930, social-networking system 1960, and third-party system 1970 may be physically or logically co-located with each other in whole or in part. Moreover, although FIG. 19 illustrates a particular number of client systems 1930, social-networking systems 1960, third-party systems 1970, and networks 1910, this disclosure contemplates any suitable number of client systems 1930, social-networking systems 1960, third-party systems 1970, and networks 1910. As an example and not by way of limitation, network environment 1900 may include multiple client system 1930, social-networking systems 1960, third-party systems 1970, and networks 1910.

This disclosure contemplates any suitable network 1910. As an example and not by way of limitation, one or more portions of network 1910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1910 may include one or more networks 1910.

Links 1950 may connect client system 1930, social-networking system 1960, and third-party system 1970 to communication network 1910 or to each other. This disclosure contemplates any suitable links 1950. In particular embodiments, one or more links 1950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1950, or a combination of two or more such links 1950. Links 1950 need not necessarily be the same throughout network environment 1900. One or more first links 1950 may differ in one or more respects from one or more second links 1950.

In particular embodiments, client system 1930 may be an electronic device including hardware, software, or embedded logic components or a combination of two or more such components and capable of carrying out the appropriate functionalities implemented or supported by client system 1930. As an example and not by way of limitation, a client system 1930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1930. A client system 1930 may enable a network user at client system 1930 to access network 1910. A client system 1930 may enable its user to communicate with other users at other client systems 1930.

In particular embodiments, client system 1930 may include a web browser 1932, and may have one or more add-ons, plug-ins, or other extensions. A user at client system 1930 may enter a Uniform Resource Locator (URL) or other address directing the web browser 1932 to a particular server (such as server 1962, or a server associated with a third-party system 1970), and the web browser 1932 may generate a Hyper Text Transfer Protocol (HTTP) request and communicate the HTTP request to server. The server may accept the HTTP request and communicate to client system 1930 one or more Hyper Text Markup Language (HTML) files responsive to the HTTP request. Client system 1930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 1960 may be a network-addressable computing system that can host an online social network. Social-networking system 1960 may generate, store, receive, and send social-networking data, such as, for example, user-profile data, concept-profile data, social-graph information, or other suitable data related to the online social network. Social-networking system 1960 may be accessed by the other components of network environment 1900 either directly or via network 1910. As an example and not by way of limitation, client system 1930 may access social-networking system 1960 using a web browser 1932, or a native application associated with social-networking system 1960 (e.g., a mobile social-networking application, a messaging application, another suitable application, or any combination thereof) either directly or via network 1910. In particular embodiments, social-networking system 1960 may include one or more servers 1962. Each server 1962 may be a unitary server or a distributed server spanning multiple computers or multiple datacenters. Servers 1962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1962 may include hardware, software, or embedded logic components or a combination of two or more such components for carrying out the appropriate functionalities implemented or supported by server 1962. In particular embodiments, social-networking system 1960 may include one or more data stores 1964. Data stores 1964 may be used to store various types of information. In particular embodiments, the information stored in data stores 1964 may be organized according to specific data structures. In particular embodiments, each data store 1964 may be a relational, columnar, correlation, or other suitable database. Although this disclosure describes or illustrates particular types of databases, this disclosure contemplates any suitable types of databases. Particular embodiments may provide interfaces that enable a client system 1930, a social-networking system 1960, or a third-party system 1970 to manage, retrieve, modify, add, or delete, the information stored in data store 1964.

In particular embodiments, social-networking system 1960 may store one or more social graphs in one or more data stores 1964. In particular embodiments, a social graph may include multiple nodes—which may include multiple user nodes (each corresponding to a particular user) or multiple concept nodes (each corresponding to a particular concept)—and multiple edges connecting the nodes. Social-networking system 1960 may provide users of the online social network the ability to communicate and interact with other users. In particular embodiments, users may join the online social network via social-networking system 1960 and then add connections (e.g., relationships) to a number of other users of social-networking system 1960 to whom they want to be connected. Herein, the term "friend" may refer to any other user of social-networking system 1960 with whom a user has formed a connection, association, or relationship via social-networking system 1960.

In particular embodiments, social-networking system 1960 may provide users with the ability to take actions on various types of items or objects, supported by social-networking system 1960. As an example and not by way of limitation, the items and objects may include groups or social networks to which users of social-networking system 1960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1960 or by an external system of third-party system 1970, which is separate from social-networking system 1960 and coupled to social-networking system 1960 via a network 1910.

In particular embodiments, social-networking system 1960 may be capable of linking a variety of entities. As an example and not by way of limitation, social-networking system 1960 may enable users to interact with each other as well as receive content from third-party systems 1970 or other entities, or to allow users to interact with these entities through an application programming interfaces (API) or other communication channels.

In particular embodiments, a third-party system 1970 may include one or more types of servers, one or more data stores, one or more interfaces, including but not limited to APIs, one or more web services, one or more content sources, one or more networks, or any other suitable components, e.g., that servers may communicate with. A third-party system 1970 may be operated by a different entity from an entity operating social-networking system 1960. In particular embodiments, however, social-networking system 1960 and third-party systems 1970 may operate in conjunction with each other to provide social-networking services to users of social-networking system 1960 or third-party systems 1970. In this sense, social-networking system 1960 may provide a platform, or backbone, which other systems, such as third-party systems 1970, may use to provide social-networking services and functionality to users across the Internet.

In particular embodiments, a third-party system 1970 may include a third-party content object provider. A third-party content object provider may include one or more sources of content objects, which may be communicated to a client system 1930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1960 also includes user-generated content objects, which may enhance a user's interactions with social-networking system 1960. User-generated content may include anything a user can add, upload, send, or "post" to social-networking system 1960. As an example and not by way of limitation, a user communicates posts to social-networking system 1960 from a client system 1930. Posts may include data such as status updates or other textual data, location information, photos, videos, links, music or other similar data or media. Content may also be added to social-networking system 1960 by a third-party through a "communication channel," such as a newsfeed or stream.

In particular embodiments, social-networking system 1960 may include a variety of servers, sub-systems, programs, modules, logs, and data stores. In particular embodiments, social-networking system 1960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1960 may also include suitable components such as network interfaces, security mechanisms, load balancers, failover servers, management-and-network-operations consoles, other suitable components, or any suitable combination thereof. In particular embodiments, social-networking system 1960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1960 to one or more client systems 1930 or one or more third-party system 1970 via network 1910. The web server may include a mail server or other messaging functionality for receiving and routing messages between social-networking system 1960 and one or more client systems 1930. An API-request server may allow a third-party system 1970 to access information from social-networking system 1960 by calling one or more APIs. An action logger may be used to receive communications from a web server about a user's actions on or off social-networking system 1960. In conjunction with the action log, a third-party-content-object log may be maintained of user exposures to third-party-content objects. A notification controller may provide information regarding content objects to a client system 1930. Information may be pushed to a client system 1930 as notifications, or information may be pulled from client system 1930 responsive to a request received from client system 1930. Authorization servers may be used to enforce one or more privacy settings of the users of social-networking system 1960. A privacy setting of a user determines how particular information associated with a user can be shared. The authorization server may allow users to opt in to or opt out of having their actions logged by social-networking system 1960 or shared with other systems (e.g., third-party system 1970), such as, for example, by setting appropriate privacy settings. Third-party-content-object stores may be used to store content objects received from third parties, such as a third-party system 1970. Location stores may be used for storing location information received from client systems 1930 associated with users. Advertisement-pricing modules may combine social information, the current time, location information, or other suitable information to provide relevant advertisements, in the form of notifications, to a user.

Figure 20:
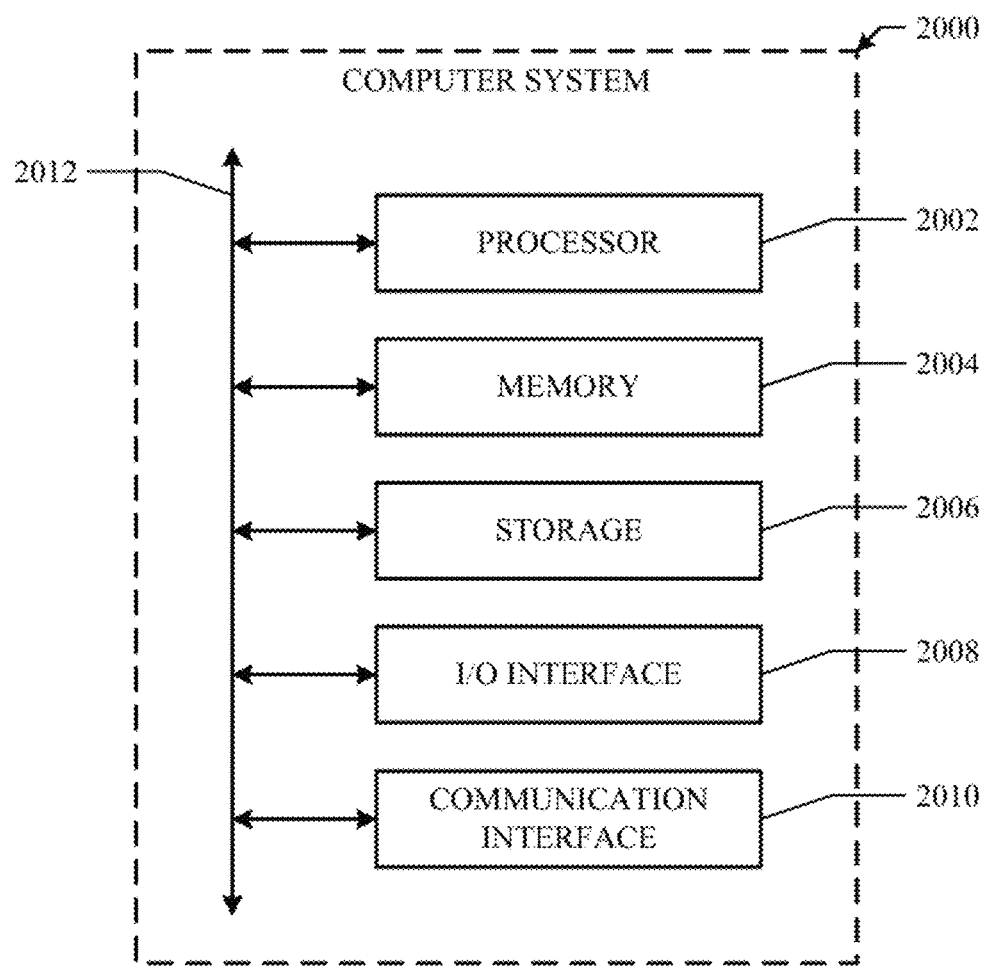
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a mobile computing device:
   capturing one or more images of a first user wearing a virtual reality (VR) display device in a real-world environment;
   receiving, from a VR system of the VR display device, a VR rendering of a VR environment, wherein the VR rendering is from the perspective of the mobile computing device with respect to the VR display device;
   generating, in real-time responsive to capturing the one or more images, a first mixed reality (MR) rendering of the first user in the VR environment, wherein the first MR rendering of the first user is based on a compositing of the one or more images of the first user and the VR rendering;

receiving, by the mobile computing device, an indication of a user interaction with one or more elements of the VR environment in the first MR rendering; and generating, in real-time responsive to the indication of the user interaction with the one or more elements, a second MR rendering of the first user in the VR environment, wherein the one or more elements have been modified according to the user interaction.

2. The method of claim 1, further comprising:

receiving, at the mobile computing device and from the VR system, one or more anchor points in the real-world environment identified from the one or more images.

3. The method of claim 2, further comprising:

determining a pose of the mobile computing device with respect to the VR display device based on at least one of the one or more anchor points.

4. The method of claim 3, further comprising:

detecting the mobile computing device has moved;

determining an updated pose of the mobile computing device with respect to the VR display device based on at least one of the one or more anchor points; and generating, at the mobile computing device in real-time responsive to detecting the mobile computing device has moved, a third MR rendering of the first user in the VR environment, wherein the third MR rendering of the first user is based on the updated pose of the mobile computing device with respect to the VR display device.

5. The method of claim 3, wherein the pose of the mobile computing device with respect to the VR display device is determined based on a triangulation between at least one of the one or more anchor points, one or more cameras of the mobile computing device, and the VR display device.

6. The method of claim 2, wherein the one or more anchor points are fixed objects in the real-world environment.

7. The method of claim 1, further comprising:

toggling, responsive to a selection on the mobile computing device, between:

a VR rendering of the VR environment from the perspective of the first user, and the first or second MR rendering of the first user in the VR environment from the perspective of the mobile computing device with respect to the VR display device.

8. The method of claim 1, further comprising:

transmitting, in real-time from the mobile computing device, the first or second MR rendering of the first user in the VR environment to an online social network for live display to one or more additional users.

9. The method of claim 1, further comprising:

segmenting the first user from the one or more images; and identifying, using a segmentation algorithm, a body of the first user within each of the one or more images, wherein the first or second MR rendering of the first user is based on a compositing of the segmented one or more images of the first user and the VR rendering.

10. The method of claim 1, further comprising:

receiving, at the mobile computing device and from the VR system, an indication the first user has activated a particular VR application on the VR system; and presenting, at the mobile computing device responsive to the received indication the first user has activated the particular VR application, a notification that the first user wearing the VR display device has started the particular VR application.

11. The method of claim 1, wherein the indication of the user interaction with the one or more elements of the VR environment is received on an interface of the mobile computing device.

12. The method of claim 1, wherein the user interaction with the one or more elements of the VR environment comprises one or more of:

modifying a VR object in the VR environment, creating a VR object in the VR environment, modifying a MR object in the VR environment, creating a MR object in the VR environment, modifying one or more attributes of VR environment, changing the VR environment from a first VR environment to a second VR environment, changing a VR application, recording the first or second MR rendering, or streaming the first or second MR rendering.

13. The method of claim 1, wherein the user interaction with the one or more elements of the VR environment comprises one or more of:

creating a VR avatar corresponding to a second user of the mobile computing device, or interacting with a VR avatar of a third user.

14. One or more computer-readable non-transitory storage media embodying software that is operable when executed by a mobile computing device to:

capture one or more images of a first user wearing a virtual reality (VR) display device in a real-world environment;

receive, from a VR system of the VR display device, a VR rendering of a VR environment, wherein the VR rendering is from the perspective of the mobile computing device with respect to the VR display device;

generate, in real-time responsive to capturing the one or more images, a first mixed reality (MR) rendering of the first user in the VR environment, wherein the first MR rendering of the first user is based on a compositing of the one or more images of the first user and the VR rendering;

receive, by the mobile computing device, an indication of a user interaction with one or more elements of the VR environment in the first MR rendering; and generate, in real-time responsive to the indication of the user interaction with the one or more elements, a second MR rendering of the first user in the VR environment, wherein the one or more elements have been modified according to the user interaction.

15. The one or more computer-readable non-transitory storage media of claim 14, wherein the software is further operable when executed to:

receive, at the mobile computing device and from the VR system, one or more anchor points in the real-world environment identified from the one or more images.

16. The one or more computer-readable non-transitory storage media of claim 15, further comprising:

determine a pose of the mobile computing device with respect to the VR display device based on at least one of the one or more anchor points.

17. The one or more computer-readable non-transitory storage media of claim 16, further comprising:

detect the mobile computing device has moved;

determine an updated pose of the mobile computing device with respect to the VR display device based on at least one of the one or more anchor points; and generate, at the mobile computing device in real-time responsive to detecting the mobile computing device has moved, a third MR rendering of the first user in the VR environment, wherein the third MR rendering of the first user is based on the updated pose of the mobile computing device with respect to the VR display device.

18. The one or more computer-readable non-transitory storage media of claim 16, wherein the pose of the mobile computing device with respect to the VR display device is determined based on a triangulation between at least one of the one or more anchor points, one or more cameras of the mobile computing device, and the VR display device.

19. The one or more computer-readable non-transitory storage media of claim 14, wherein the one or more anchor points are fixed objects in the real-world environment.

20. A mobile computing device comprising: one or more processors; and a non-transitory memory coupled to the one or more processors comprising instructions executable by the one or more processors, the one or more processors operable when executing the instructions to:

capture one or more images of a first user wearing a virtual reality (VR) display device in a real-world environment;

receive, from a VR system of the VR display device, a VR rendering of a VR environment, wherein the VR rendering is from the perspective of the mobile computing device with respect to the VR display device;

generate, in real-time responsive to capturing the one or more images, a first mixed reality (MR) rendering of the first user in the VR environment, wherein the first MR rendering of the first user is based on a compositing of the one or more images of the first user and the VR rendering;

receive, by the mobile computing device, an indication of a user interaction with one or more elements of the VR environment in the first MR rendering; and generate, in real-time responsive to the indication of the user interaction with the one or more elements, a second MR rendering of the first user in the VR environment, wherein the one or more elements have been modified according to the user interaction.

\* \* \* \* \*